(12) United States Patent
Shin et al.

(10) Patent No.: US 12,462,761 B2
(45) Date of Patent: Nov. 4, 2025

(54) DISPLAY DEVICE

(71) Applicant: LG DISPLAY CO., LTD., Seoul (KR)

(72) Inventors: SeungHwan Shin, Jeonju-si (KR); WonHo Lee, Paju-si (KR); YoungMin Jeong, Paju-si (KR)

(73) Assignee: LG Display Co., Ltd (KR)

( * ) Notice: Subject to any disclaimer, the term of this patent is extended or adjusted under 35 U.S.C. 154(b) by 0 days.

(21) Appl. No.: 18/385,186

(22) Filed: Oct. 30, 2023

(65) Prior Publication Data
US 2024/0212628 A1    Jun. 27, 2024

(30) Foreign Application Priority Data
Dec. 26, 2022   (KR) .................. 10-2022-0184758

(51) Int. Cl.
| | |
|---|---|
| *G09G 3/32* | (2016.01) |
| *G09G 3/20* | (2006.01) |
| *G09G 3/3225* | (2016.01) |
| *G09G 3/3266* | (2016.01) |
| *G09G 3/3275* | (2016.01) |
| *H10K 59/35* | (2023.01) |

(52) U.S. Cl.
CPC ......... *G09G 3/3275* (2013.01); *G09G 3/2003* (2013.01); *G09G 3/32* (2013.01); *G09G 3/3225* (2013.01); *G09G 3/3266* (2013.01); *H10K 59/351* (2023.02); *H10K 59/352* (2023.02); *H10K 59/353* (2023.02); *G09G 2300/0426* (2013.01); *G09G 2300/0452* (2013.01); *G09G 2300/0465* (2013.01); *G09G 2310/0267* (2013.01); *G09G 2310/0275* (2013.01)

(58) Field of Classification Search
CPC ... G09G 2300/0426; G09G 2300/0452; G09G 3/3233; G09G 3/3275; G09G 3/2003; G09G 3/3648; G09G 3/207; G09G 3/2074; G09G 3/32; G09G 2310/0267; G09G 2310/0275; G09G 2300/0465; G09G 3/3266; G09G 2300/0439; H10K 59/351; H10K 59/353; H10K 59/122; H10K 59/131; H10K 59/121; H10K 59/8791

See application file for complete search history.

(56) References Cited

U.S. PATENT DOCUMENTS

| | | | |
|---|---|---|---|
| 2005/0270444 A1* | 12/2005 | Miller | G09G 3/3216 |
| | | | 349/108 |
| 2011/0156992 A1* | 6/2011 | Moon | G09G 3/3614 |
| | | | 345/84 |

(Continued)

FOREIGN PATENT DOCUMENTS

KR    10-2023-0103541 A    7/2023

*Primary Examiner* — Dismery Mercedes
(74) *Attorney, Agent, or Firm* — Fish & Richardson P.C.

(57) ABSTRACT

In one aspect, a display device includes a display panel including a plurality of pixels, each of the plurality of pixels including a first sub pixel, a second sub pixel, a third sub pixel, and a fourth sub pixel; a data driver configured to supply a data signal to the plurality of pixels through data lines; and a gate driver configured to supply a gate signal to the plurality of pixels through gate lines. A first interval between first sub pixels and fourth sub pixels of the plurality of subpixels that are in the same column is the same, and a second interval between second sub pixels and third sub pixels of the plurality of subpixels in the same column is the same.

20 Claims, 17 Drawing Sheets

(56) References Cited

U.S. PATENT DOCUMENTS

| | | | |
|---|---|---|---|
| 2011/0234655 A1* | 9/2011 | Tzeng | G09G 3/3677 |
| | | | 345/698 |
| 2012/0147314 A1* | 6/2012 | Yoshizawa | G02B 5/201 |
| | | | 315/192 |
| 2012/0262362 A1* | 10/2012 | Uehara | G02B 30/30 |
| | | | 345/88 |
| 2015/0009106 A1* | 1/2015 | Lee | G09G 3/3233 |
| | | | 345/77 |
| 2015/0309360 A1* | 10/2015 | Wang | G02F 1/133514 |
| | | | 345/694 |
| 2016/0125784 A1* | 5/2016 | Son | G09G 3/3607 |
| | | | 345/694 |
| 2016/0125811 A1* | 5/2016 | Park | G09G 3/3258 |
| | | | 345/694 |
| 2017/0155078 A1* | 6/2017 | Lee | H10K 59/80522 |
| 2017/0345382 A1* | 11/2017 | Sang | G02F 1/13 |
| 2020/0320942 A1* | 10/2020 | He | G09G 3/3688 |
| 2020/0388238 A1* | 12/2020 | He | G09G 3/3607 |
| 2024/0179991 A1* | 5/2024 | Bai | H10K 59/122 |

\* cited by examiner

10(VDDL,DL1,DL2,DL3,DL4,AEL)
20(21,22,23,24,25,26)
30(GL1,GL2,GL3,GL4)
CNT(CNT1,CNT2,CNT3 CNT4,CNT5,CNT6)

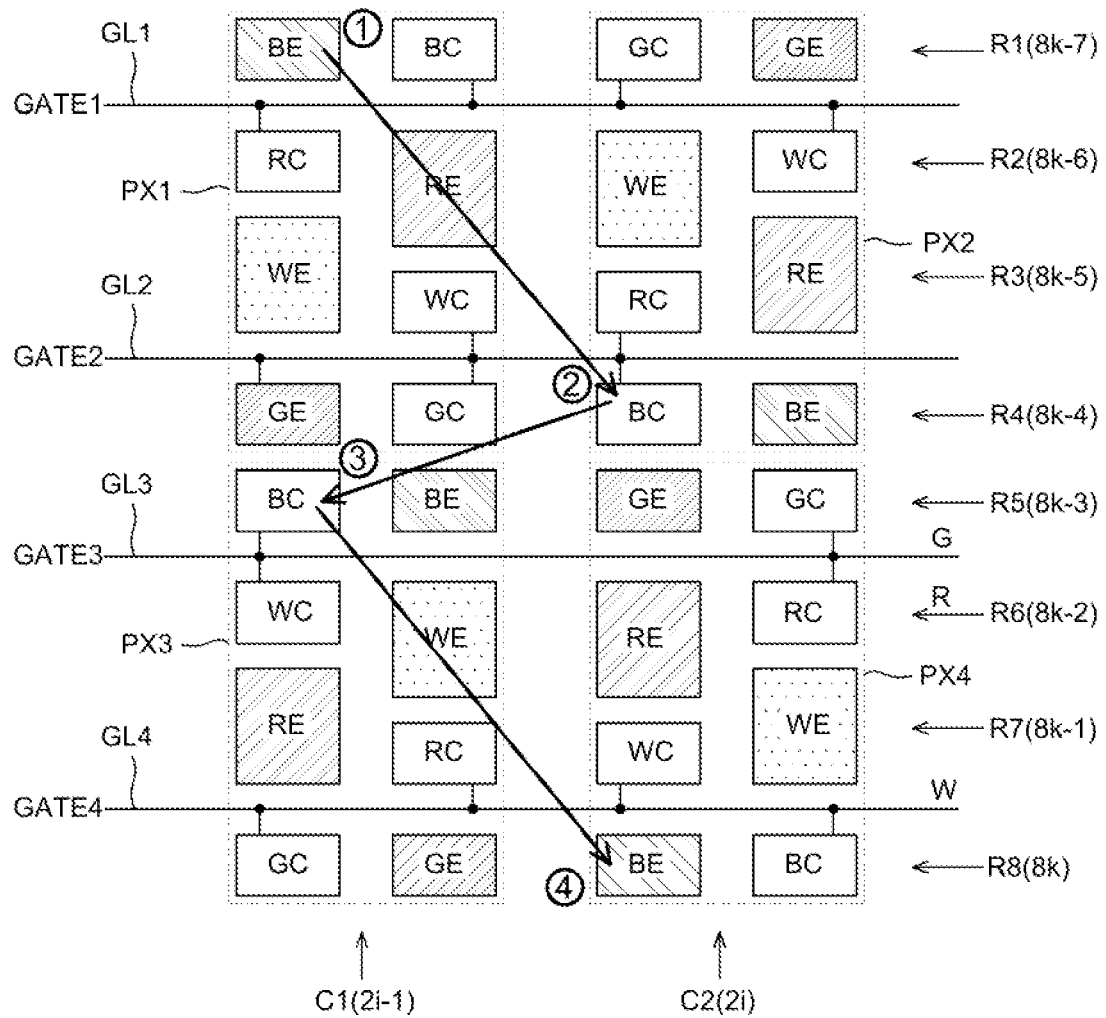

Odd Frame

DISPLAY DEVICE

CROSS-REFERENCE TO RELATED APPLICATIONS

This application claims the priority of Korean Patent Application No. 10-2022-0184758 filed on Dec. 26, 2022, in the Korean Intellectual Property Office, the disclosure of which is incorporated herein by reference in its entirety.

BACKGROUND

Field of Disclosure

The present disclosure relates to a display device, and more particularly, to a display device which is capable of being driven at a high driving frequency.

Description of Related Art

The display device may include a display panel including a plurality of sub pixels and a driver for driving the display panel. The driver may include a gate driver configured to supply a gate signal to the display panel and a data driver configured to supply a data signal. When a signal, such as a gate signal and a data signal, is supplied to a sub pixel included in the display panel, a selected sub pixel emits light to display images.

In recent years, as the size of the display panel is increased, to smoothly drive the display panel, the display panel may be driven in a double rate driving (DRD) manner which increases a driving frequency. As described above, when the driving frequency is increased, a time to charge a voltage (data voltage) corresponding to the data signal in a sub pixel may be sharply reduced. Accordingly, there may be a problem in that data is not fully charged in the sub pixel.

SUMMARY

Aspects of the present disclosure are directed to a display device with improved aperture ratio.

Other aspects of the present disclosure are directed to a display device which reduces an RC delay of a data signal, improves a charging rate of the data signal, and/or reduced an RC delay of a gate signal.

Objectives of the present disclosure are not limited to the above-mentioned objects, and other objects, which are not mentioned above, may be clearly understood by those skilled in the art from the following descriptions.

In one aspect, a display device includes a display panel including a plurality of pixels, each of the plurality of pixels including a first sub pixel, a second sub pixel, a third sub pixel, and a fourth sub pixel; a data driver configured to supply a data signal to the plurality of pixels through data lines; and a gate driver configured to supply a gate signal to the plurality of pixels through gate lines. A first interval between first sub pixels and fourth sub pixels of the plurality of subpixels that are in the same column is the same, and a second interval between second sub pixels and third sub pixels of the plurality of subpixels in the same column is the same.

In another aspect, the plurality of pixels includes a first pixel disposed in a first column; a second pixel disposed in a second column which is adjacent to the first column in a first direction; a third pixel which is disposed in the first column and is adjacent to the first pixel in a second direction which is different from the first direction; and a fourth pixel which is disposed in the second column and is adjacent to the second pixel in the second direction.

In another aspect, the first sub pixels and the fourth sub pixels that are in the same column have an interval corresponding to a distance between centers of adjacent two pixels in the corresponding column.

In another aspect, the first sub pixels and the fourth sub pixels that are in the first column have an interval corresponding to a distance between centers of the first pixel and the third pixel.

In another aspect, sub pixels of two of the plurality of pixels which are adjacent along the first direction are disposed in different orders.

In another aspect, placement orders of sub pixels included in two of the plurality of pixels which are adjacent along the first direction are opposite to each other.

In another aspect, sub pixels included in the first pixel in the first column are disposed in an order of the first sub pixel, the second sub pixel, the third sub pixel, and the fourth sub pixel along the second direction and sub pixels included in the second pixel disposed in the second column are disposed in the order of the fourth sub pixel, the third sub pixel, the second sub pixel, and the first sub pixel along the second direction.

In another aspect, the first sub pixel includes a first light emitting diode and a first circuit element, the second sub pixel includes a second light emitting diode and a second circuit element, the third sub pixel includes a third light emitting diode and a third circuit element, and the fourth sub pixel includes a fourth light emitting diode and a fourth circuit element.

In another aspect, light emitting diodes and circuit elements included in the first to fourth sub pixels are adjacent along the first direction.

In another aspect, the first column includes a first sub column and a second sub column adjacent to the first sub column in the first direction, the second column includes a third sub column and a fourth sub column adjacent to the third sub column in the first direction, and light emitting diodes included in two pixels adjacent to each other along the second direction and configured to emit same color light, are disposed in different sub columns.

In another aspect, the first light emitting diode included in the first sub pixel of the first pixel is in the first sub column, the first light emitting diode included in the first sub pixel of the third pixel is in the second sub column, the first light emitting diode included in the first sub pixel of the fourth pixel is in the third sub column, and the first light emitting diode included in the first sub pixel of the second pixel is in the fourth sub column.

In another aspect, the light emitting diodes which are included in two pixels adjacent to each other along the first direction and are configured emit same color light, are disposed to be spaced apart from each other.

In another aspect, the display device further includes an auxiliary electrode layer formed on the same layer as the data lines, wherein each of the gate lines and the auxiliary electrode layer are connected to each other through a contact hole while partially overlapping.

In another aspect, sub pixels included in the first pixel are disposed in first to fourth rows which are sequentially disposed along the second direction, respectively, sub pixels included in the second pixel are disposed in the first to fourth rows, respectively, sub pixels included in the third pixel are disposed in fifth to eighth rows which are sequentially disposed along the second direction, respectively, and sub pixels included in the fourth pixel are disposed in the fifth to eighth rows, respectively.

In another aspect, among the gate lines, a first gate line is disposed between the first row and the second row, a second gate line is disposed between the third row and the fourth row, a third gate line is disposed between the fifth row and the sixth row, and a fourth gate line is disposed between the seventh row and the eighth row.

In another aspect, an order of applying turn-on level gate signals to the gate lines in an odd-numbered frame is different from an order of applying turn-on level gate signals to the gate lines in an even-numbered frame.

In another aspect, in the odd-numbered frame, the turn-on level gate signals are applied in an order of the second gate line, the first gate line, the fourth gate line, and the third gate line and in the even-numbered frame, the turn-on level gate signals are applied in an order of the first gate line, the second gate line, the third gate line, and the fourth gate line.

In another aspect, the data lines include a first data line connected to the first sub pixels, a second data line connected to the second sub pixels, a third data line connected to the third sub pixels, and a fourth data line connected to the fourth sub pixels, the first data line and the second data line are disposed at one side of the plurality of pixels disposed in the same column and the third data line and the fourth data line are disposed at another side of the plurality of pixels disposed in the same column.

In another aspect, the display device further includes a high potential voltage line configured to supply a high potential voltage to the plurality of pixels, wherein the high potential voltage line is disposed between the first data line and the second data line or between the third data line and the fourth data line.

In another aspect, the display device further includes a reference voltage line configured to supply a reference voltage to the plurality of pixels, wherein the reference voltage line is disposed between the light emitting diode and the circuit element included in each of the sub pixels.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which:

FIG. 9B is a view for explaining an example of a driving order in an even-numbered frame of a display device of FIG. 1 according to an exemplary aspect of the present disclosure;

DETAILED DESCRIPTION

Figure 1:
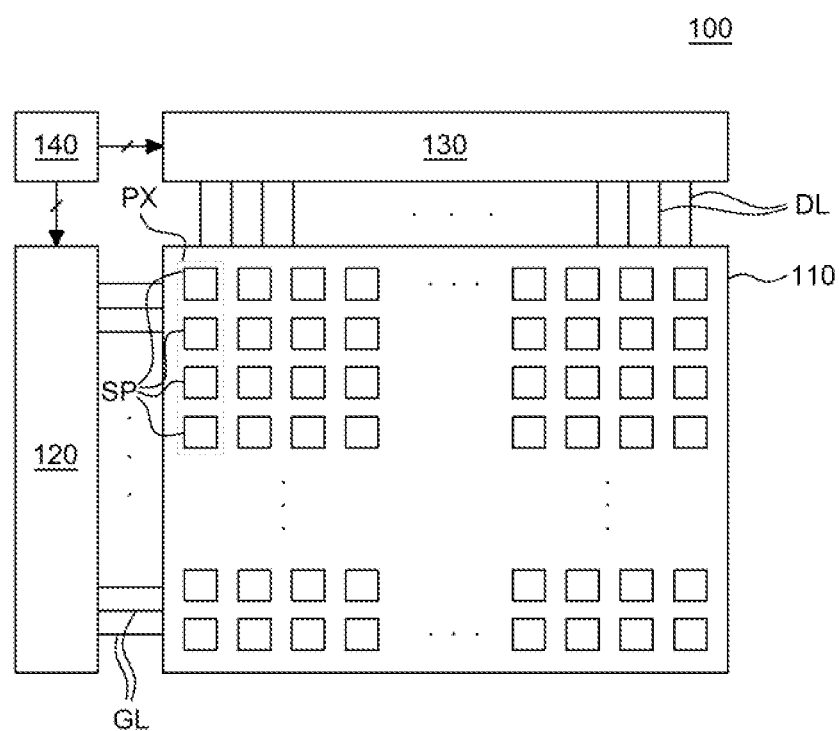
FIG. 1 is a block diagram illustrating a display device according to an exemplary aspect of the present disclosure.

Various examples of the present disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure may be partially or entirely adhered to or combined with each other and may be interlocked and operated in technically various ways, and the embodiments may be carried out independently of or in association with each other.

Hereinafter, a display device according to exemplary embodiments of the present disclosure will be described in detail with reference to accompanying drawings.

A transistor used for a display device according to exemplary embodiments of the present disclosure may be implemented by any one transistor of n-channel transistors (NMOS) and p-channel transistors (PMOS). The transistor may be implemented by an oxide semiconductor transistor having an oxide semiconductor as an active layer or an LTPS transistor having a low temperature poly-silicon (LTPS) as an active layer. The transistor may include at least a gate electrode, a source electrode, and a drain electrode. The transistor may be implemented as a thin film transistor on a display panel. In the transistor, carriers flow from the source electrode to the drain electrode. In the case of the n-channel transistor NMOS, since the carriers are electrons, to allow the electrons to flow from the source electrode to the drain electrode, a source voltage may be lower than a drain voltage. The current in the n-channel transistor NMOS flows from the drain electrode to the source electrode and the source electrode may serve as an output terminal. In the case of the p-channel transistor (PMOS), since the carriers are holes, to allow the holes to flow from the source electrode to the drain electrode, a source voltage may be higher than a drain voltage. In the p-channel transistor PMOS, the holes flow from the source electrode to the drain electrode so that current flows from the source to the drain and the drain electrode serves as an output terminal. Accordingly, the source and the drain may be switched in accordance with the applied voltage so that it should be noted that the source and the drain of the transistor are not fixed. In the present specification, it is assumed that the transistor is an n-channel transistor NMOS, but is not limited thereto so that the p-channel transistor may be used and thus a circuit configuration may be changed.

A gate signal of transistors which are used as switching elements may swing between a gate-on voltage and a gate-off voltage. The gate-on voltage may be set to be higher than a threshold voltage Vth of the transistor and the gate-off voltage may be set to be lower than the threshold voltage Vth of the transistor. The transistor may be turned on in response to the gate-on voltage and may be turned off in response to the gate-off voltage. In the case of the n-channel transistor NMOS, the gate-on voltage may be a gate high voltage VGH and the gate-off voltage may be a gate low voltage VGL. In the case of the p-channel transistor PMOS, the gate-on voltage is a gate low voltage VGL and the gate-off voltage may be a gate high voltage VGH.

Hereinafter, various exemplary embodiments of the present disclosure will be described in detail with reference to accompanying drawings.

FIG. 1 is a block diagram illustrating a display device according to an exemplary aspect of the present disclosure.

Referring to FIG. 1, a display device 100 according to an exemplary aspect of the present disclosure may include a display panel 110, a gate driver 120, a data driver 130, and a timing controller 140.

The display panel 110 (or a pixel unit or a display unit) may display an image. The display panel 110 may include various circuits, signal lines, and light emitting diodes disposed on the substrate. The display panel 110 may include a plurality of pixels PX which is divided by a plurality of data lines DL and a plurality of gate lines GL intersecting each other and is connected to the plurality of data lines DL and the plurality of gate lines GL.

The display panel 110 may include an active area in which an image is displayed and a non-active area in which various signal lines or pads are formed. The non-active area is located at the outside of the active area. The display panel 110 may be implemented by a display panel used in various display devices, such as a liquid crystal display device, an organic light emitting display device, or an electrophoretic display device. Hereinafter, it is described that the display panel 110 is a panel used in the organic light emitting display device, but the exemplary aspect of the present disclosure is not limited thereto.

The display panel 110 may include a plurality of pixels PX disposed on the active area. Each of the plurality of pixels PX may be electrically connected to a corresponding gate line, among gate lines GL and a corresponding data line, among data lines DL. Therefore, a gate signal and a data signal may be applied to each pixel PX, through the gate line and the data line. Each pixel PX may implement the gray scale by the applied gate signal and data signal and finally, the image may be displayed in the active area by the gray scales displayed by each pixel PX.

Further, each of the plurality of pixels PX may include a plurality of sub pixels SP. The sub pixels SP included in one pixel PX may emit different color light. For example, the sub pixels SP may include a red sub pixel, a green sub pixel, a blue sub pixel, and a white sub pixel, but are not limited thereto. The plurality of sub pixels SP may configure a pixel PX. That is, the red sub pixel, the green sub pixel, the blue sub pixel, and the white sub pixel configure one pixel PX and the display panel 110 may include a plurality of pixels PX.

The timing controller 140 (or a timing control circuit) may receive timing signals such as a vertical synchronization signal, a horizontal synchronization signal, a data enable signal, or a dot clock by means of a receiving circuit such as an LVDS or TMDS interface connected to the outside (for example, a host system). The timing controller 140 may generate and output timing control signals based on the input timing signal to control the data driver 130 and the gate driver 120.

The data driver 130 (or a data driving circuit) may supply a data signal to the plurality of sub pixels SP. To this end, the data driver 130 may include at least one source drive IC (integrated circuit). The source drive IC may be supplied with digital video data and a source timing control signal from the timing controller 140. The source drive IC converts digital video data into a gamma voltage in response to a source timing control signal to generate a data signal and supply the data signal to the sub pixels SP through the data lines DL of the display panel 110. The source drive IC may be connected to the data line DL of the display panel 110 by a chip on glass (COG) process or a tape automated bonding (TAB) process. Further, the source drive IC is formed on the display panel 110 or is formed on a separate PCB substrate to be connected to the display panel 110.

The gate driver 120 (or a gate driving circuit, a scan driver, or a scan driving circuit) may supply a gate signal to the plurality of sub pixels SP. The gate driver 120 may include a level shifter and a shift register. The level shifter shifts a level of a clock signal input at a transistor-transistor-logic (TTL) level from the timing controller 140 and then supplies the clock signal to the shift register. The shift register may be formed in the non-active area of the display panel 110, by a GIP manner, but is not limited thereto. The shift register may be configured by a plurality of stages which shifts the gate signal to output, in response to the clock signal and the driving signal. The plurality of stages included in the shift register may sequentially output the gate signal through a plurality of output terminals.

Hereinafter, a driving circuit (pixel circuit) for driving one sub pixel SP will be described in more detail with reference to FIG. 2.

Figure 2:
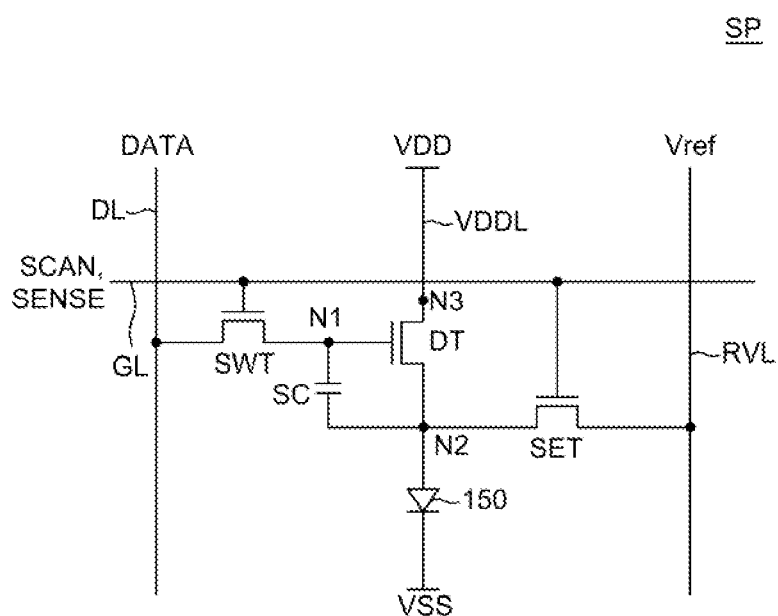
FIG. 2 is a circuit diagram illustrating an example of a sub pixel included in a display device of FIG. 1.

FIG. 2 is a circuit diagram illustrating an example of a sub pixel included in a display device of FIG. 1 according to an exemplary aspect of the present disclosure.

In FIG. 2, a circuit diagram of one sub pixel SP among the plurality of sub pixels SP included in the display device 100 which has been described with reference to FIG. 1 is illustrated.

Referring to FIG. 2, the sub pixel SP may include a switching transistor SWT, a sensing transistor SET, a driving transistor DT, a storage capacitor SC, and a light emitting diode 150.

The light emitting diode 150 may include an anode, an emission layer, and a cathode. For example, the emission layer may be an organic layer and the organic layer may include various organic layers such as a hole injection layer, a hole transport layer, an organic light emitting layer, an electron transport layer, and an electron injection layer. The anode of the light emitting diode 150 may be connected to a driving transistor DT (for example, an output terminal of a driving transistor DT) and a low potential voltage VSS may be applied to the cathode of the light emitting diode 150.

While in FIG. 2, the light emitting diode 150 is described as an organic light emitting diode, the present disclosure is not limited thereto. For example, the light emitting diode 150 may be an inorganic light emitting diode (for example, an LED).

The driving transistor DT supplies a driving current to the light emitting diode 150 to allow the light emitting diode 150 to emit light. The driving transistor DT may include a gate electrode connected to a first node N1, a source electrode (or an output terminal) connected to a second node N2, and a drain electrode (or an input terminal) connected to a third node N3. The first node N1 to which the gate electrode of the driving transistor DT is connected may be connected to the switching transistor SWT. The third node N3 to which the drain electrode is connected may be connected to a high potential voltage line VDDL to be applied with a high potential voltage VDD. The second node N2 to which the source electrode is connected may be connected to the anode of the light emitting diode 150.

The switching transistor SWT may transmit the data signal DATA (or a data voltage) to the gate electrode of the driving transistor DT (or the first node N1). The switching transistor SWT may include a gate electrode connected to the gate line GL, a drain electrode connected to the data line DL, and a source electrode connected to the gate electrode of the driving transistor DT (or the first node N1). The switching transistor SWT is turned on by a scan signal SCAN (or a gate signal) supplied from the gate line GL to transmit a data signal DATA (or a data voltage) supplied from the data line DL to the gate electrode of the driving transistor DT (or the first node N1).

The storage capacitor SC may maintain a voltage (data voltage) corresponding to the data signal DATA for one frame. One electrode of the storage capacitor SC may be connected to the first node N1 and the other electrode may be connected to the second node N2. That is, the storage capacitor SC may be connected between the gate electrode and the source electrode of the driving transistor DT.

In one example, as a driving time of each sub pixel SP is increased, the circuit element such as the driving transistor DT may be degraded. Accordingly, a unique characteristic value of the circuit element such as a driving transistor DT may be changed. Here, the unique characteristic value of the circuit element may include a threshold voltage Vth of the driving transistor DT or a mobility of the driving transistor DT. The change in the characteristic value of the circuit element may cause a luminance change of the corresponding sub pixel SP. Accordingly, the change in the characteristic value of the circuit element may be used as the same concept as the luminance change of the sub pixel SP.

Further, the degree of the change in the characteristic values between circuit elements of each sub pixel SP may vary depending on a difference in a degree of degradation of each circuit element. Such a difference in the changing degree of the characteristic values between the circuit elements may cause a luminance deviation between the sub pixels SP. Accordingly, the characteristic value deviation between circuit elements may be used as the same concept as the luminance deviation between the sub pixels SP. The change in the characteristic values of the circuit elements, that is, the luminance change of the sub pixel SP and the characteristic value deviation between the circuit elements, that is, the luminance deviation between the sub pixels SP may cause problems such as the degradation of the accuracy for luminance expressiveness of the sub pixel SP or screen abnormality.

Therefore, the display device 100 (see FIG. 1) according to the exemplary aspect of the present disclosure may provide a sensing function of sensing a characteristic value for the sub pixel SP and a compensating function of compensating for the characteristic value of the sub pixel SP using the sensing result.

For example, as illustrated in FIG. 2, the sub pixel SP may further include a sensing transistor SET for controlling a voltage state of a source electrode of the driving transistor DT.

The sensing transistor SET is connected between the source electrode of the driving transistor DT and a reference voltage line RVL configured to supply a reference voltage Vref and may include a gate electrode which is connected to the gate line GL. Therefore, the sensing transistor SET is turned on by the sensing signal SENSE applied through the gate line GL to supply the reference voltage Vref which is supplied through the reference voltage line RVL to the source electrode of the driving transistor DT. Further, the sensing transistor SET may be utilized as one of voltage sensing paths for the source electrode of the driving transistor DT.

As described above, the reference voltage Vref may be applied to the source electrode of the driving transistor DT by means of the sensing transistor SET which is turned on by the sensing signal SENSE. Further, a voltage for sensing the threshold voltage Vth of the driving transistor DT or the mobility of the driving transistor DT may be detected by the reference voltage line RVL. Further, the data driver 130 (see FIG. 1) of the display device 100 (see FIG. 1) may compensate for the data signal DATA in accordance with a variation of the threshold voltage Vth of the driving transistor DT or the mobility of the driving transistor DT.

As illustrated in FIG. 2, the switching transistor SWT and the sensing transistor SET included in the sub pixel SP may share one gate line GL. That is, the switching transistor SWT and the sensing transistor SET are connected to the same gate line GL to be supplied with the same signal (gate signal). For ease of discussion, in the above description, a signal which is applied to the gate electrode of the switching transistor SWT is referred to as a scan signal SCAN and a signal which is applied to the gate electrode of the sensing transistor SET is referred to as a sensing signal SENSE. However, the scan signal SCAN and the sensing signal SENSE applied to one sub pixel SP are the same signal which is transmitted through the same gate line GL.

However, this is just illustrative so that the exemplary aspect of the present disclosure is not limited thereto. For example, only the switching transistor SWT is connected to the gate line GL and the sensing transistor SET may be connected to a separate sensing line. Therefore, the scan signal SCAN may be applied to the switching transistor SWT through the gate line GL and the sensing signal SENSE may be applied to the sensing transistor SET through the sensing line.

Hereinafter, as illustrated in FIG. 2, it will be described that the switching transistor SWT and the sensing transistor SET included in the sub pixel SP share one gate line GL. Therefore, hereinafter, the scan signal SCAN and the sensing signal SENSE are defined as gate signals GATE1, GATE2, GATE3, and GATE4 and a placement relationship of the plurality sub pixels will be described with reference to FIGS. 3 to 7.

Figure 3:
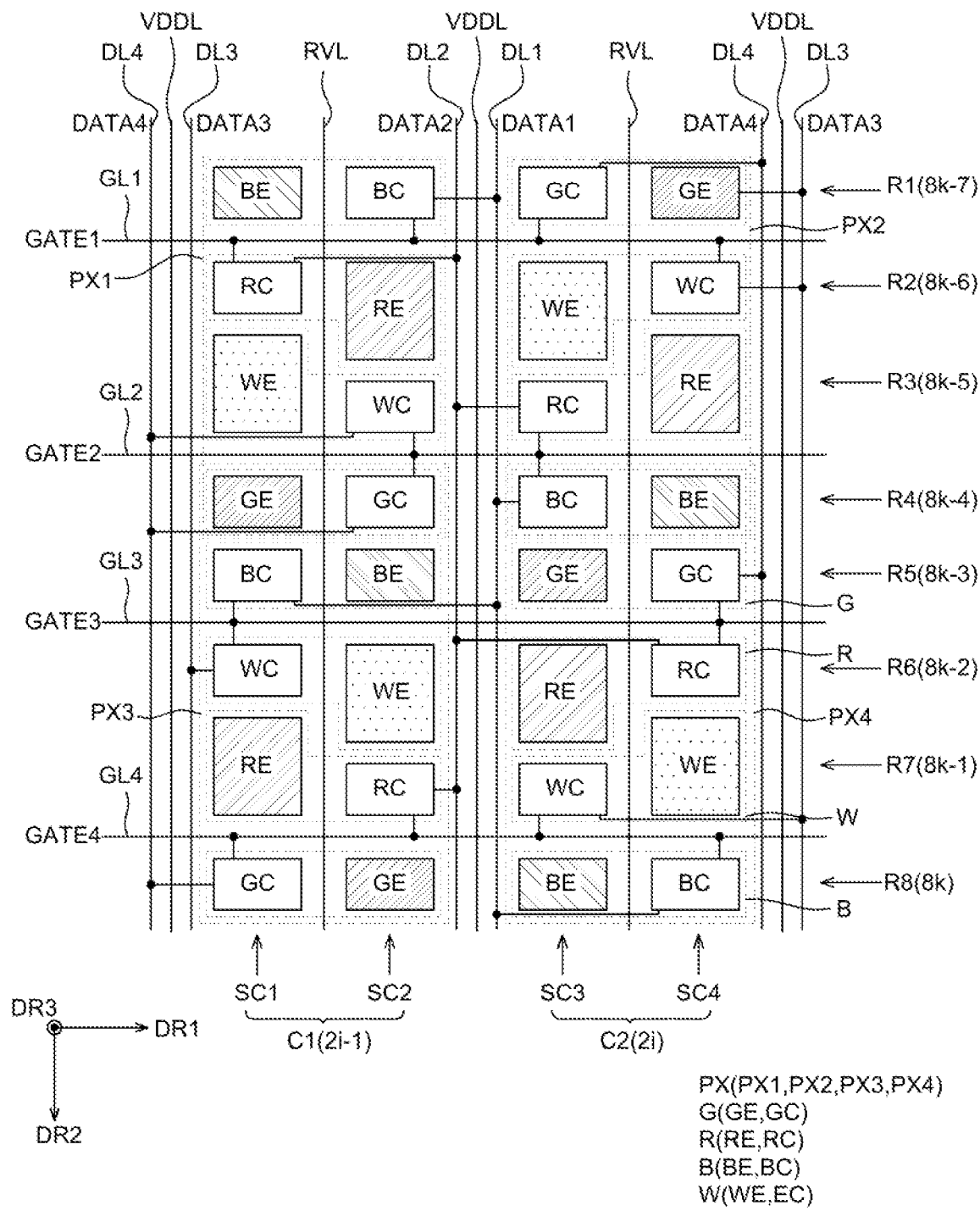
FIG. 3 is a block diagram for explaining an example of a placement relationship of sub pixels included in a display device of FIG. 1 according to an exemplary aspect of the present disclosure.

FIG. 3 is a block diagram for explaining an example of a placement relationship of sub pixels included in a display device of FIG. 1 according to an exemplary aspect of the present disclosure.

Figure 4:
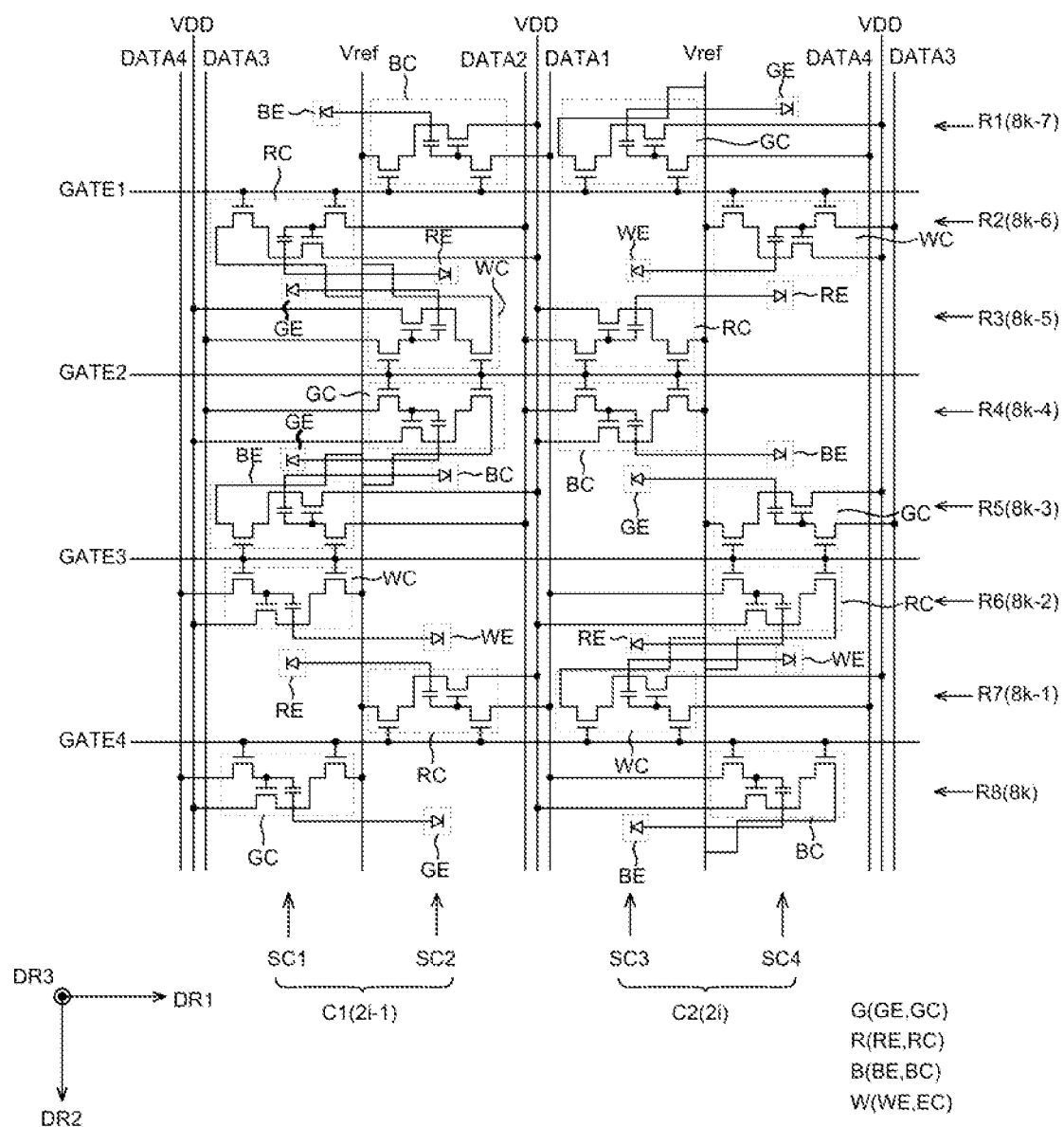
FIG. 4 is a circuit diagram for explaining an example of a placement relationship of sub pixels included in a display device of FIG. 1 according to an exemplary aspect of the present disclosure.

FIG. 4 is a circuit diagram for explaining an example of a placement relationship of sub pixels included in a display device of FIG. 1 according to an exemplary aspect of the present disclosure.

Figure 5:
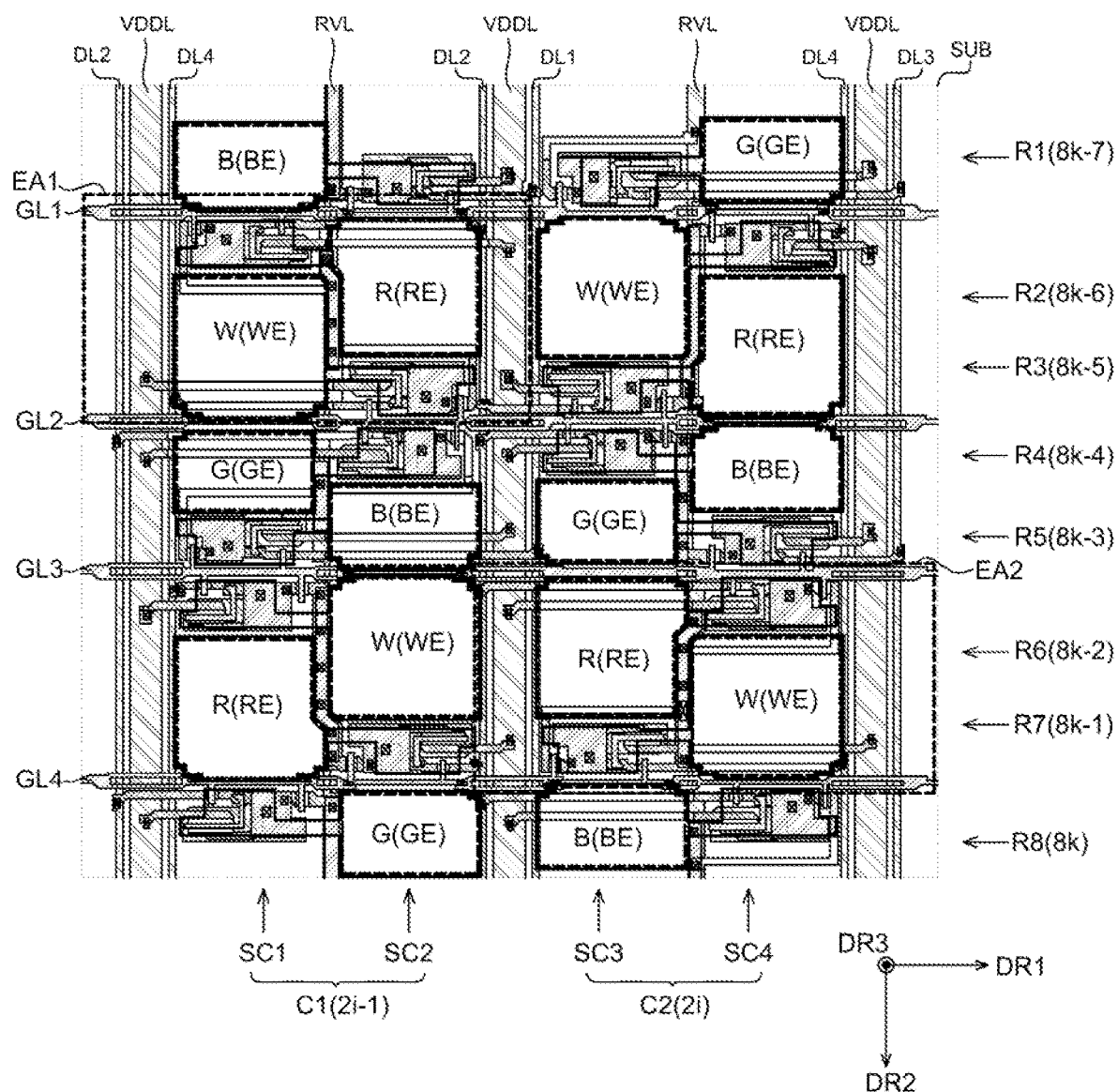
FIG. 5 is a layout diagram for explaining an example of a placement relationship of sub pixels included in a display device of FIG. 1 according to an exemplary aspect of the present disclosure.

FIG. 5 is a layout diagram for explaining an example of a placement relationship of sub pixels included in a display device of FIG. 1 according to an exemplary aspect of the present disclosure.

In FIGS. 3 to 5, for the convenience of description, only four pixels which are disposed in a matrix are illustrated and the placement relationship of four pixels which are disposed in a 2 2 matrix may be repeated on the active area of the display device 100 (see FIG. 1).

Furthermore, a horizontal direction on the plane is referred to as a first direction DR1 (or a row direction) and a vertical direction (or a perpendicular direction) on the plane is referred to as a second direction DR2 (or a column direction). Further, a direction (or a thickness direction) perpendicular to a plane defined by the first direction DR1 and the second direction DR2 is illustrated as a third direction DR3.

Referring to FIGS. 1 to 5, pixels PX1, PX2, PX3, and PX4 are disposed to be spaced apart from each other. Further, one pixel PX (for example, first to fourth pixels PX1, PX2, PX3, and PX4) may include four sub pixels B, R, W, and G. For example, one pixel PX may include a first sub pixel B, a second sub pixel R, a third sub pixel W, and a fourth sub pixel G. For example, the first sub pixel B is a blue sub pixel, the second sub pixel R is a red sub pixel, the third sub pixel W is a white sub pixel, and the fourth sub pixel G is a green sub pixel. However, this is just illustrative, so that it is not limited thereto and the plurality of sub pixels B, R, W, and G may be changed to sub pixels with various colors (magenta, yellow, and cyan).

In a first column C1 (for example, a 2i-1-th column, i is an integer which is larger than 0), a first pixel PXT and a third pixel PX3 may be disposed along the second direction DR2. Further, in a second column C2 (for example, a 2i-th column), a second pixel PX2 and a fourth pixel PX4 may be disposed along the second direction DR2.

Further, in each row (R1 to R8), sub pixels B, R, W, and G may be disposed. For example, in a first row R1 (for example, an 8k–7-th row, k is an integer which is larger than 0), a first sub pixel B of the first pixel PXT and a fourth sub pixel G of the second pixel PX2 are disposed along the first direction DR1. In a second row R2 (for example, an 8k–6-th row), a second sub pixel R of the first pixel PXT and a third sub pixel W of the second pixel PX2 are disposed along the first direction DR1. In a third row R3 (for example, an 8k–5-th row), a third sub pixel W of the first pixel PXT and a second sub pixel R of the second pixel PX2 are disposed along the first direction DR1. In a fourth row R4 (for example, an 8k–4-th row), a fourth sub pixel G of the first pixel PXT and a first sub pixel B of the second pixel PX2 are disposed along the first direction DR1. Similarly, in a fifth row R5 (for example, an 8k–3-th row), a first sub pixel B of the third pixel PX3 and a fourth sub pixel G of the fourth pixel PX4 are disposed along the first direction DR1. In a sixth row R6 (for example, an 8k–2-th row), a third sub pixel W of the third pixel PX3 and a second sub pixel R of the fourth pixel PX4 are disposed along the first direction DR1. In a seventh row R7 (for example, an 8k–1-th row), a second sub pixel R of the third pixel PX3 and a third sub pixel W of the fourth pixel PX4 are disposed along the first direction DR1. In an eighth row R8 (for example, an 8k-th row), a fourth sub pixel G of the third pixel PX3 and a first sub pixel B of the fourth pixel PX4 are disposed along the first direction DR1.

The first sub pixel B may include a first light emitting diode BE and a first circuit element BC and the second sub pixel R may include a second light emitting diode RE and a second circuit element RC. The third sub pixel W may include a third light emitting diode WE and a third circuit element WC and the fourth sub pixel G may include a fourth light emitting diode GE and a fourth circuit element GC.

In one example, each of the sub pixels B, R, W, and G illustrated in FIG. 4 may have the substantially same circuit configuration as the circuit of the sub pixel SP which has been described with reference to FIG. 2. For example, each of the circuit elements BC, RC, WC, and GC of the sub pixels B, R, W, and G illustrated in FIG. 4 includes a switching transistor SWT, a sensing transistor SET, a driving transistor DT, and a storage capacitor SC of a sub pixel SP which has been described with reference to FIG. 2. Each of the light emitting diodes BE, RE, WE, and GE of the sub pixels B, R, W, and G may include the light emitting diode 150 which has been described with reference to FIG. 2.

The data lines DL1, DL2, DL3, and DL4 may include a first data line DL1 connected to the first sub pixel B, a second data line DL2 connected to the second sub pixel R, a third data line DL3 connected to the third sub pixel W, and a fourth data line DL4 connected to the fourth sub pixel G. The data lines DL1, DL2, DL3, and DL4 may be disposed to extend along the second direction DR2.

In one exemplary aspect, the first data line DL1 and the second data line DL2 may be disposed at one side of the pixel PX and the third data line DL3 and the fourth data line DL4 may be disposed at the other side of the pixel PX.

For example, with respect to the first column C1 in which the first pixel PX1 and the third pixel PX3 are disposed, the first data line DL1 and the second data line DL2 are disposed at right sides of the first and third pixels PX1 and PX3 to be connected to the first sub pixel B and the second sub pixel R, respectively. Further, with respect to the first column C1 in which the first pixel PX1 and the third pixel PX3 are disposed, the third data line DL3 and the fourth data line DL4 are disposed at left sides of the first and third pixels PX1 and PX3 to be connected to the third sub pixel W and the fourth sub pixel G, respectively.

In contrast, with respect to the second column C2 in which the second pixel PX2 and the fourth pixel PX4 are disposed, the first data line DL1 and the second data line DL2 are disposed at left sides of the second and fourth pixels PX2 and PX4 to be connected to the first sub pixel B and the second sub pixel R, respectively. Further, with respect to the second column C2 in which the second pixel PX2 and the fourth pixel PX4 are disposed, the third data line DL3 and the fourth data line DL4 are disposed at right sides of the second and fourth pixels PX2 and PX4 to be connected to the third sub pixel W and the fourth sub pixel G, respectively.

A first data signal DATA1 which is a blue data signal (data voltage) may be applied to the first data line DL1 and a second data signal DATA2 which is a red data signal (data voltage) may be applied to the second data line DL2. Further, a third data signal DATA3 which is a white data signal (data voltage) may be applied to the third data line DL3 and a fourth data signal DATA4 which is a green data signal (data voltage) may be applied to the fourth data line DL4.

In one exemplary aspect, each of the plurality of high potential voltage lines VDDL may be disposed to extend along the second direction DR2 between two adjacent data lines, among the data lines DL1, DL2, DL3, and DL4. A high potential voltage VDD may be applied to each of the plurality of high potential voltage lines VDDL.

For example, the high potential voltage line VDDL may be disposed between the first data line DL1 and the second data line DL2 which are adjacent and the high potential voltage line VDDL may be disposed between the third data line DL3 and the fourth data line DL4 which are adjacent.

In one exemplary aspect, each of the plurality of reference voltage lines RVL may be disposed in the sub pixels B, R, W, and G. The plurality of reference voltage lines RVL may be disposed to extend along the second direction DR2. A reference voltage Vref may be applied to each of the plurality of reference voltage lines RVL.

For example, each of the reference voltage lines RVL may be disposed between the first light emitting diode BE and the first circuit element BC, between the second light emitting diode RE and the second circuit element RC, between the third light emitting diode WE and the third circuit element WC, and between the fourth light emitting diode GE and the fourth circuit element GC.

Each of the gate lines GL1, GL2, GL3, and GL4 is disposed in the pixels PX1, PX2, PX3, and PX4 to supply gate signals GATE1, GATE2, GATE3, and GATE4 to the pixels PX1, PX2, PX3, and PX4, respectively.

For example, the first gate line GL1 may be disposed between the first row R1 and the second row R2 and the second gate line GL2 may be disposed between the third row R3 and the fourth row R4. The third gate line GL3 may be disposed between the fifth row R5 and the sixth row R6 and the fourth gate line GL4 may be disposed between the seventh row R7 and the eight row R8.

Accordingly, the first gate line GL1 is disposed between the first sub pixel B and the second sub pixel R of the first pixel PX1 to be connected to the first circuit element BC and the second circuit element RC. Further, the first gate line GL1 is disposed between the fourth sub pixel G and the third sub pixel W of the second pixel PX2 to be connected to the fourth circuit element GC and the third circuit element WC. Further, the second gate line GL2 is disposed between the third sub pixel W and the fourth sub pixel G of the first pixel PX1 to be connected to the third circuit element WC and the fourth circuit element GC. Further, the second gate line GL2 is disposed between the second sub pixel R and the first sub pixel B of the second pixel PX2 to be connected to the second circuit element RC and the first circuit element BC. Further, the third gate line GL3 is disposed between the first sub pixel B and the third sub pixel W of the third pixel PX3 to be connected to the first circuit element BC and the third circuit element WC. Further, the third gate line GL3 is disposed between the fourth sub pixel G and the second sub pixel R of the fourth pixel PX4 to be connected to the fourth circuit element GC and the second circuit element RC. Further, the fourth gate line GL4 is disposed between the second sub pixel R and the fourth sub pixel G of the third pixel PX3 to be connected to the second circuit element RC and the fourth circuit element GC. Further, the fourth gate line GL4 is disposed between the third sub pixel W and the first sub pixel B of the fourth pixel PX4 to be connected to the third circuit element WC and the first circuit element BC.

In one exemplary aspect, each of the first sub pixels B and the fourth sub pixels G, among the sub pixels B, R, W, and G disposed in the same column may be disposed with the same interval. For example, each of the first sub pixels B and the fourth sub pixels G disposed in the same column may be disposed with an interval corresponding to a distance between centers of two adjacent pixels disposed in the corresponding column.

For example, the first sub pixels B disposed in the first column C1 may be disposed with the same interval. For example, the first sub pixel B of the first pixel PX1 and the first sub pixel B of the third pixel PX3 may be disposed with an interval corresponding to a distance between the centers of the first pixel PX1 and the third pixel PX3 (for example, an interval corresponding to a distance between the first row R1 and the fifth row R5). Similarly, the first sub pixels B disposed in the second column C2 may be disposed with the same interval. For example, the first sub pixel B of the second pixel PX2 and the first sub pixel B of the fourth pixel PX4 may be disposed with an interval corresponding to a distance between the centers of the second pixel PX2 and the fourth pixel PX4 (for example, an interval corresponding to a distance between the fourth row R4 and the eighth row R8).

As another example, the fourth sub pixels G disposed in the first column C1 may be disposed with the same interval. For example, the fourth sub pixel G of the first pixel PX1 and the fourth sub pixel G of the third pixel PX3 may be disposed with an interval corresponding to a distance between the centers of the first pixel PX1 and the third pixel PX3 (for example, an interval corresponding to a distance between the fourth row R4 and the eighth row R8). Similarly, the fourth sub pixels G disposed in the second column C2 may be disposed with the same interval. For example, the fourth sub pixel G of the second pixel PX2 and the fourth sub pixel G of the fourth pixel PX4 may be disposed with an interval corresponding to a distance between the centers of the second pixel PX2 and the fourth pixel PX4 (for example, an interval corresponding to a distance between the first row R1 and the fifth row R5).

In contrast, each of the second sub pixel R and the third sub pixel W, among the sub pixels B, R, W, and G disposed in the same column, may be disposed with different intervals.

For example, an interval between the second sub pixels R disposed in the first column C1 and the first to eighth rows R1 to R8 may be larger than an interval between the second sub pixels R disposed in the second column C2 and the first to eighth rows R1 to R8. For example, the second sub pixel R of the first pixel PX1 may be disposed in the second row R2 and the second sub pixel R of the third pixel PX3 may be disposed in the seventh row R7. In contrast, the second sub pixel R of the second pixel PX2 may be disposed in the third row R3 and the second sub pixel R of the fourth pixel PX4 may be disposed in the sixth row R6.

As another example, an interval between the third sub pixels W disposed in the first column C1 and the first to eighth rows R1 to R8 may be smaller than an interval between the third sub pixels W disposed in the second column C2 and the first to eighth rows R1 to R8. For example, the third sub pixel W of the first pixel PX1 may be disposed in the third row R3 and the third sub pixel W of the third pixel PX3 may be disposed in the sixth row R6. The third sub pixel W of the second pixel PX2 may be disposed in the second row R2 and the third sub pixel W of the fourth pixel PX4 may be disposed in the seventh row R7.

That is, an interval between the second sub pixels R disposed in the first column C1 and the first to eighth rows R1 to R8 may be substantially the same as an interval between the third sub pixels W disposed in the second column C2 and the first to eighth rows R1 to R8. An interval between the third sub pixels W disposed in the first column C1 and the first to eighth rows R1 to R8 may be substantially the same as an interval between the second sub pixels R disposed in the second column C2 and the first to eighth rows R1 to R8.

In one exemplary aspect, sub pixels B, R, W, G included in two pixels which are disposed to be adjacent along the first direction DR1 may be disposed in different orders. For example, placement orders of the sub pixels B, R, W, G included in two pixels which are disposed to be adjacent along the first direction DR1 may be opposite to each other. In other words, the sub pixels B, R, W, and G included in two pixels which are disposed to be adjacent along the first direction DR1 may be symmetric and vertically inverted with respect to the second direction DR2 (or with respect to the high potential voltage line VDDL).

To be more specific, the sub pixels B, R, W, and G of the first pixel PX1 disposed in the first column C1 may be disposed in the order of the first sub pixel B, the second sub pixel R, the third sub pixel W, and the fourth sub pixel G along the second direction DR2. Further, the sub pixels B, R, W, and G of the second pixel PX2 disposed in the second column C2 may be disposed in the order of the fourth sub pixel G, the third sub pixel W, the second sub pixel R, and the first sub pixel B along the second direction DR2.

Similarly, the sub pixels B, R, W, and G of the third pixel PX3 disposed in the first column C1 may be disposed in the order of the first sub pixel B, the third sub pixel W, the second sub pixel R, and the fourth sub pixel G along the second direction DR2. Further, the sub pixels B, R, W, and G of the fourth pixel PX4 disposed in the second column C2 may be disposed in the order of the fourth sub pixel G, the second sub pixel R, the third sub pixel W, and the first sub pixel B along the second direction DR2.

The light emitting diode and the circuit element included in each of the sub pixels B, R, W, and G may be disposed along the first direction DR1 in the same row. For example, the light emitting diode and the circuit element which are included in each of the sub pixels B, R, W, and G may be disposed in a first sub column SC1 and a second sub column SC2 of the first column C1. Further, the light emitting diode and the circuit element which are included in each of the sub pixels B, R, W, and G may be disposed in a third sub column SC3 and a fourth sub column SC4 of the second column C2.

For example, with respect to the first pixel PX1, the first sub pixel B of the first pixel PX1 disposed in the first row R1 may include a first light emitting diode BE disposed in the first sub column SC1 and a first circuit element BC disposed in the second sub column SC2. The second sub pixel R of the first pixel PX1 disposed in the second row R2 may include a second circuit element RC disposed in the first sub column SC1 and a second light emitting diode RE disposed in the second sub column SC2. The third sub pixel W of the first pixel PX1 disposed in the third row R3 may include a third light emitting diode WE disposed in the first sub column SC1 and a third circuit element WC disposed in the second sub column SC2. The fourth sub pixel G of the first pixel PX1 disposed in the fourth row R4 may include a fourth light emitting diode GE disposed in the first sub column SC1 and a fourth circuit element GC disposed in the second sub column SC2.

As another example, with respect to the second pixel PX2, the fourth sub pixel G of the second pixel PX2 disposed in the first row R1 may include a fourth circuit element GC disposed in the third sub column SC3 and a fourth light emitting diode GE disposed in the fourth sub column SC4. The third sub pixel W of the second pixel PX2 disposed in the second row R2 may include a third light emitting diode WE disposed in the third sub column SC3 and a third circuit element WC disposed in the fourth sub column SC4. The second sub pixel R of the second pixel PX2 disposed in the third row R3 may include a second circuit element RC disposed in the third sub column SC3 and a second light emitting diode RE disposed in the fourth sub column SC4. The first sub pixel B of the second pixel PX2 disposed in the fourth row R4 may include a first circuit element BC disposed in the third sub column SC3 and a first light emitting diode BE disposed in the fourth sub column SC4.

As another example, with respect to the third pixel PX3, a first sub pixel B of the third pixel PX3 disposed in the fifth row R5 may include a first circuit element BC disposed in the first sub column SC1 and a first light emitting diode BE disposed in the second sub column SC2. The third sub pixel W of the third pixel PX3 disposed in a sixth row R6 may include a third circuit element WC disposed in the first sub column SC1 and a third light emitting diode WE disposed in the second sub column SC2. The second sub pixel R of the third pixel PX3 disposed in a seventh row R7 may include a second light emitting diode RE disposed in the first sub column SC1 and a second circuit element RC disposed in the second sub column SC2. The fourth sub pixel G of the third pixel PX3 disposed in an eighth row R8 may include a fourth circuit element GC disposed in the first sub column SC1 and a fourth light emitting diode GE disposed in the second sub column SC2.

As another example, with respect to the fourth pixel PX4, the fourth sub pixel G of the fourth pixel PX4 disposed in the fifth row R5 may include a fourth light emitting diode GE disposed in the third sub column SC3 and a fourth circuit element GC disposed in the fourth sub column SC4. The second sub pixel R of the fourth pixel PX4 disposed in the sixth row R6 may include a second light emitting diode RE disposed in the third sub column SC3 and a second circuit element RC disposed in the fourth sub column SC4. The third sub pixel W of the fourth pixel PX4 disposed in the seventh row R7 may include a third circuit element WC disposed in the third sub column SC3 and a third light emitting diode WE disposed in the fourth sub column SC4. The first sub pixel B of the fourth pixel PX4 disposed in the eighth row R8 may include a first light emitting diode BE disposed in the third sub column SC3 and a first circuit element BC disposed in the fourth sub column SC4.

In one exemplary aspect, light emitting diodes which are included in two pixels which are adjacent along the second direction DR2 and emits same color light may be disposed in different sub columns.

For example, the first light emitting diodes BE included in the first pixel PX1 and the third pixel PX3 which are adjacent along the first direction DR1 and are disposed in the first column C1 may be disposed in different sub columns SC1 and SC2. Further, the second light emitting diodes RE included in the first pixel PX1 and the third pixel PX3 may be disposed in different sub columns SC1 and SC2. Further, the third light emitting diodes WE included in the first pixel PX1 and the third pixel PX3 may be disposed in different sub columns SC1 and SC2. Further, the fourth light emitting diodes GE included in the first pixel PX1 and the third pixel PX3 may be disposed in different sub columns SC1 and SC2. For example, the first light emitting diode BE of the first pixel PX1 and the first light emitting diode BE of the third pixel PX3 may be disposed in the first sub column SC1 and the second sub column SC2, respectively. The second light emitting diode RE of the first pixel PX1 and the second light emitting diode RE of the third pixel PX3 may be disposed in the second sub column SC2 and the first sub column SC1, respectively. The third light emitting diode WE of the first pixel PX1 and the third light emitting diode WE of the third pixel PX3 may be disposed in the first sub column SC1 and the second sub column SC2, respectively. The fourth light emitting diode GE of the first pixel PX1 and the fourth light emitting diode GE of the third pixel PX3 may be disposed in the first sub column SC1 and the second sub column SC2, respectively.

As another example, the first light emitting diodes BE included in the second pixel PX2 and the fourth pixel PX4 which are adjacent along the first direction DR1 and are disposed in the second column C2 may be disposed in different sub columns SC3 and SC4. Further, the second light emitting diodes RE included in the second pixel PX2 and the fourth pixel PX4 may be disposed in different sub columns SC3 and SC4. Further, the third light emitting diodes WE included in the second pixel PX2 and the fourth pixel PX4 may be disposed in different sub columns SC3 and SC4. Further, the fourth light emitting diodes GE included in the second pixel PX2 and the fourth pixel PX4 may be disposed in different sub columns SC3 and SC4. For example, the first light emitting diode BE of the second pixel PX2 and the first light emitting diode BE of the fourth pixel PX4 may be disposed in the fourth sub column SC4 and the third sub column SC3, respectively. The second light emitting diode RE of the second pixel PX2 and the second light emitting diode RE of the fourth pixel PX4 may be disposed in the fourth sub column SC4 and the third sub column SC3, respectively. The third light emitting diode WE of the second pixel PX2 and the third light emitting diode WE of the fourth pixel PX4 may be disposed in the third sub column SC3 and the fourth sub column SC4, respectively. The fourth light emitting diode GE of the second pixel PX2 and the fourth light emitting diode GE of the fourth pixel PX4 may be disposed in the fourth sub column SC4 and the third sub column SC3, respectively.

Further, in the exemplary aspect, light emitting diodes which are included in two pixels adjacent along the first direction DR1 and emit the same color light may be disposed to be spaced apart from each other.

For example, the first light emitting diodes BE included in the first pixel PX1 and the second pixel PX2 which are adjacent along the first direction DR1 may be disposed to be spaced apart from each other. The second light emitting diodes RE included in the first pixel PX1 and the second pixel PX2 may be disposed to be spaced apart from each other and the third light emitting diodes WE included in the first pixel PX1 and the second pixel PX2 may be disposed to be spaced apart from each other. The fourth light emitting diodes GE included in the first pixel PX1 and the second pixel PX2 may be disposed to be spaced apart from each other.

As another example, the first light emitting diodes BE included in the third pixel PX3 and the fourth pixel PX4 which are adjacent along the first direction DR1 may be disposed to be spaced apart from each other. The second light emitting diodes RE included in the third pixel PX3 and the fourth pixel PX4 may be disposed to be spaced apart from each other and the third light emitting diodes WE included in the third pixel PX3 and the fourth pixel PX4 may be disposed to be spaced apart from each other. The fourth light emitting diodes GE included in the third pixel PX3 and the fourth pixel PX4 may be disposed to be spaced apart from each other.

As described above, in the display device 100 (see FIG. 1) according to the exemplary aspect of the present disclosure, light emitting diodes which are included in two pixels adjacent along the second direction DR2 and emit the same color light may be disposed in different sub columns. Further, light emitting diodes which are included in two pixels adjacent along the first direction DR1 and emit the same color light may be disposed to be spaced apart from each other. By doing this, light emitting diodes which emit the same color light may be uniformly distributed (or disposed or arranged). Accordingly, a pixel clumping structure is resolved (for example, removed or minimized) to improve the image quality of the display device 100 (see FIG. 1).

Further, in the display device 100 (see FIG. 1) according to the exemplary aspect of the present disclosure, two data lines disposed between two pixels which are adjacent along the first direction DR1 (for example, first and second data lines DL1 and DL2 or third and fourth data lines DL3 and DL4) may apply data signals to sub pixels included in two pixels disposed on both sides. Accordingly, the number of data lines DL1, DL2, DL3, and DL4 which apply data signals to the plurality of sub pixels B, R, W, and G is minimized so that an area occupied by the data line in the display panel is reduced. Therefore, the emission area may be designed to be expanded so that the aperture ratio of the display device 100 (see FIG. 1) may be improved. For example, an area occupied by the emission area in the fourth sub pixel G is 29.4%, an area occupied by the emission area in the second sub pixel R is 48.2%, an area occupied by the emission area in the third sub pixel W is 54.8%, and an area occupied by the emission area in the first sub pixel B is 32.8%. Therefore, an average aperture ratio may be expanded to 41.3%.

Further, the number of data lines is reduced so that a total resistance of the data line is reduced to reduce the RC delay of the data signal. Accordingly, a charging rate of the data signal may be increased.

Referring to FIG. 5, in one exemplary aspect, some of connection lines for supplying a driving voltage (for example, a high potential voltage VDD and a reference voltage Vref) and a data voltage to the circuit element of the sub pixel may be disposed to overlap a light emitting diode corresponding to an emission area of the sub pixel.

Still with reference to to FIG. 5, in one exemplary aspect, the gate lines GL1, GL2, GL3, and GL4 may be formed with a double line structure together with an auxiliary electrode layer AEL which is formed on the same layer as the data lines DL1, DL2, DL3, and DL4 (or a high potential voltage line VDDL and a reference voltage line RVL).

The placement relationship of the connection lines and the double line structure of the gate lines GL1, GL2, GL3, and GL4 will be described in more detail below with reference to FIGS. 6 to 8. Further, for the convenience of description, configurations of the pixels PX1, PX2, PX3, and PX4 will be described with respect to configurations illustrated in parts EA1 and EA2 illustrated in FIGS. 5 to 7.

Figure 6:
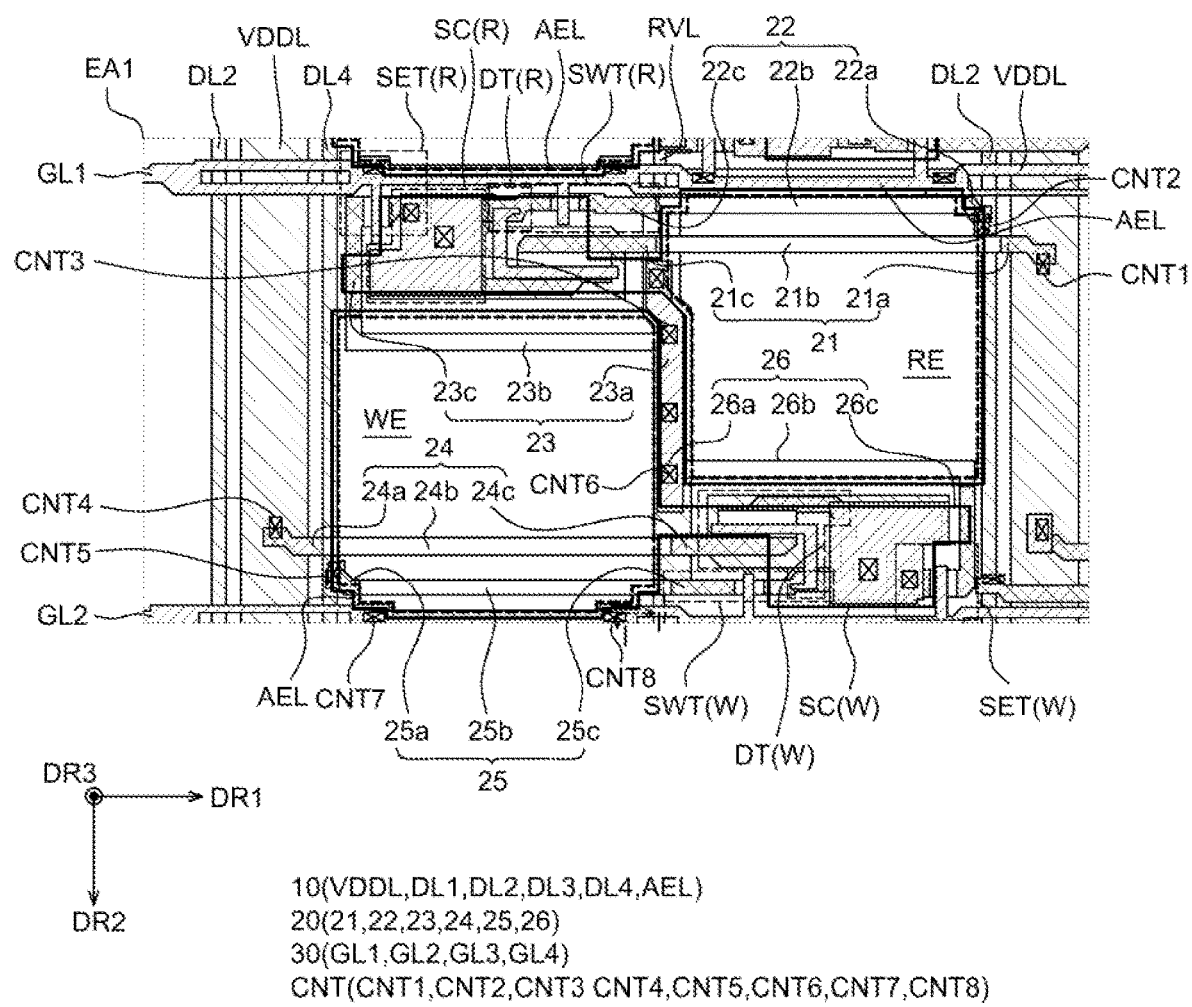
FIG. 6 is an enlarged view of an example of a part EA1 of FIG. 5 according to an exemplary aspect of the present disclosure.

FIG. 6 is an enlarged view of an example of a part EA1 of FIG. 5 according to an exemplary aspect of the present disclosure.

Figure 7:
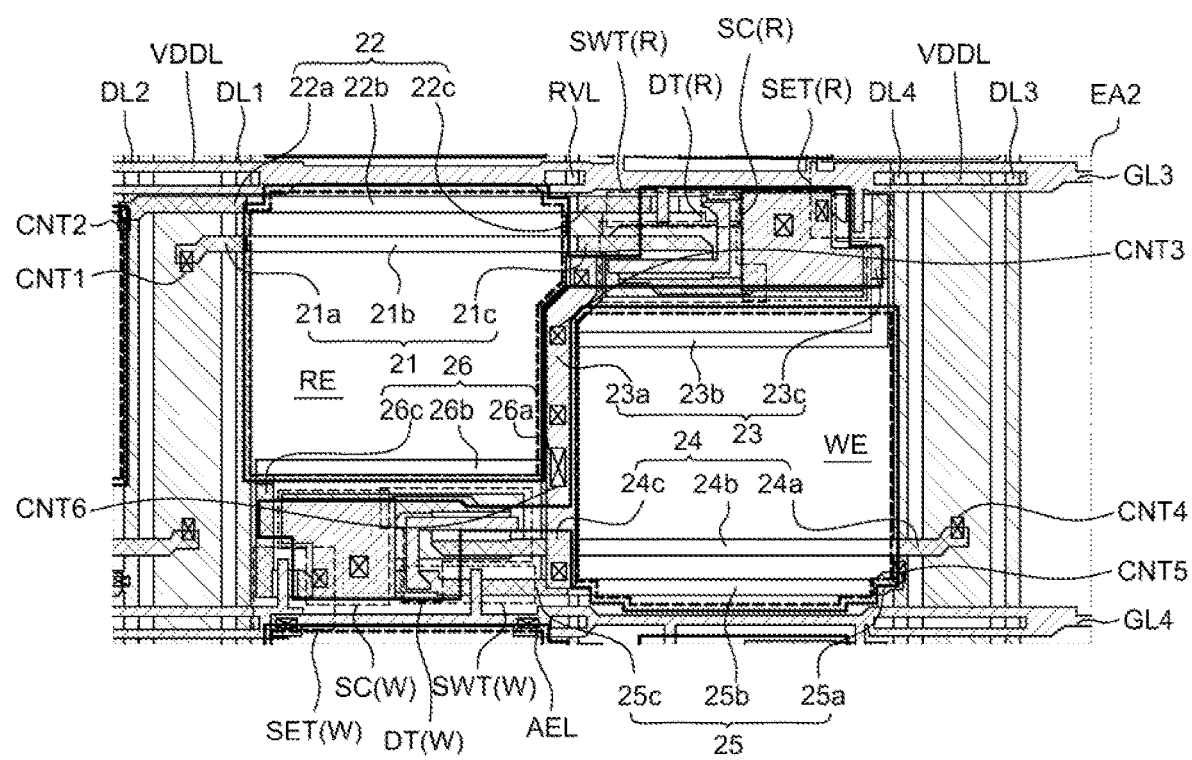
FIG. 7 is an enlarged view of an example of a part EA2 of FIG. 5 according to an exemplary aspect of the present disclosure.
Figure 7:
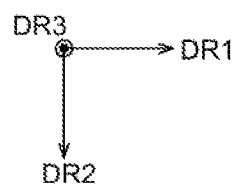

FIG. 7 is an enlarged view of an example of a part EA2 of FIG. 5 according to an exemplary aspect of the present disclosure.

Figure 8:
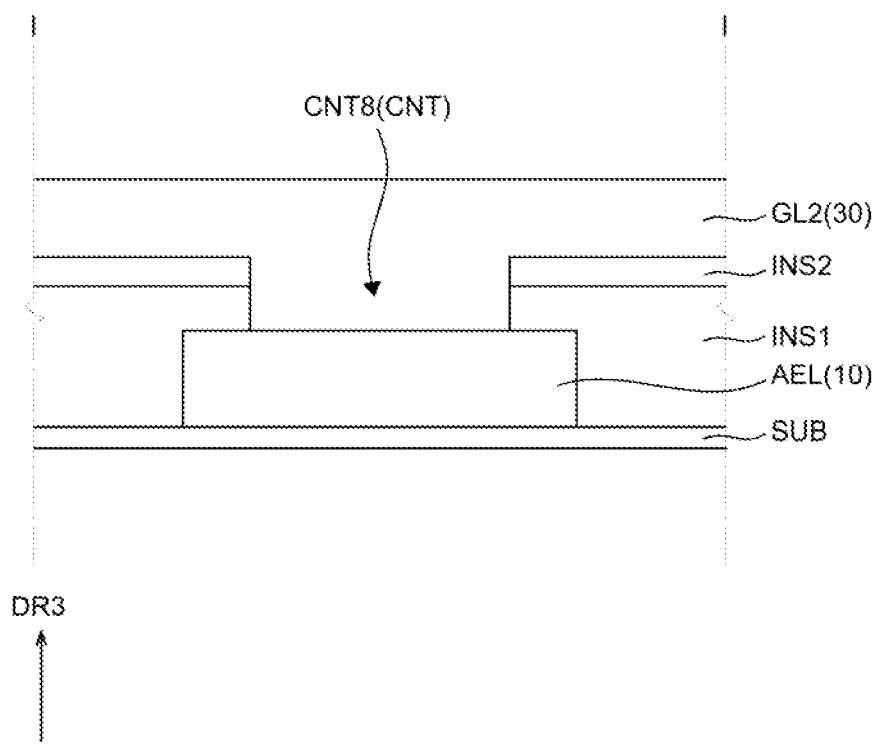
FIG. 8 is a cross-sectional view taken along the line I-I' of FIG. 6 according to an exemplary aspect of the present disclosure.

FIG. 8 is a cross-sectional view taken along the line I-I' of FIG. 6 according to an exemplary aspect of the present disclosure.

Referring to FIGS. 3 to 7, each of the pixels PX1, PX2, PX3, and PX4 of the display device 100 (see FIG. 1) according to the exemplary aspect of the present disclosure may include sub pixels B, R, W, and G and the sub pixels B, R, W, and G may include light emitting diodes BE, RE, WE, and GE and circuit elements BC, RC, WC, and GC, respectively.

Further, each of the circuit elements BC, RC, WC, and GC of the sub pixels B, R, W, and G may include a switching transistor, a sensing transistor, a driving transistor, and a storage capacitor. For example, in each of the circuit elements BC, RC, WC, and GC, a switching transistor, a sensing transistor, a driving transistor, and a storage capacitor may be formed by a combination of all or some of electrode layers 10, 20, and 30 to be described below.

For example, as illustrated in FIGS. 6 and 7, the second circuit element RC of the second sub pixel R may include a switching transistor SWT(R), a sensing transistor SET(R), a driving transistor DT(R), and a storage capacitor SC(R). The third circuit element WC of the third sub pixel W may include a switching transistor SWT(W), a sensing transistor SET(W), a driving transistor DT(W), and a storage capacitor SC(W).

Pixels PX1, PX2, PX3, and PX4 of the display device 100 (see FIG. 1) according to the exemplary aspect of the present disclosure may be provided on the substrate SUB. For example, each of the pixels PX1, PX2, PX3, and PX4 may include a first electrode layer 10, a second electrode layer 20, a third electrode layer 30, and contact holes CNT for bringing the electrode layers to be in contact with each other (or connecting the electrode layers to each other). While not separately illustrated in FIGS. 6 and 7, insulating layers including an oxide or an inorganic material may be interposed between the electrodes 10, 20, and 30.

The first electrode layer 10 is disposed on the substrate SUB and may include data lines DL1, DL2, DL3, and DL4, a high potential voltage line VDDL, and an auxiliary electrode layer AEL. As described above, the data lines DL1, DL2, DL3, and DL4 and the high potential voltage line VDDL extend along the second direction DR2 and the high potential voltage line VDDL may be disposed between adjacent data lines DL1, DL2, DL3, and DL4.

In one exemplary aspect, the auxiliary electrode layer AEL is provided to extend along the first direction DR1 and may be disposed to be spaced apart from the data lines DL1, DL2, DL3, and DL4 and the high potential voltage line VDDL.

The second electrode layer 20 is disposed on the first electrode layer 10 and may include connection lines 21 to 26 which connect configurations included in the pixels PX1, PX2, PX3, and PX4 to the data lines DL1, DL2, DL3, and DL4, the high potential voltage line VDDL, or the reference voltage line RVL.

A first connection line 21 of the second electrode layer 20 is connected to the high potential voltage line VDDL and the driving transistor DT(R) of the second circuit element RC to supply a high potential voltage VDD supplied from the high potential voltage line VDDL to the driving transistor DT(R) of the second circuit element RC.

To be more specific, the first connection line 21 may include a first sub connection line 21a, a second sub connection line 21b, and a third sub connection line 21c. One end of the first sub connection line 21a is electrically connected to the high potential voltage line VDDL through a first contact hole CNT1 and the other end may be connected to one end of the second sub connection line 21b. Further, one end of the third sub connection line 21c is connected to the other end of the second sub connection line 21b and the other end may be connected to the driving transistor DT(R) of the second circuit element RC and/or configure a part of the driving transistor DT(R) of the second circuit element RC.

In one exemplary aspect, at least a part of the first connection line 21 for supplying a high potential voltage VDD to the driving transistor DT (R) of the second circuit element RC may overlap at least a part of the second light emitting diode RE. Here, the second light emitting diode RE defines an emission area of the second sub pixel R so that the at least a part of the first connection line 21 which overlaps the second light emitting diode RE may include a transparent material. For example, the second sub connection line 21b of the first connection line 21 overlaps at least a part of the second light emitting diode RE and may include a transparent material.

In this exemplary aspect, the first to third sub connection lines 21a, 21b, and 21c may be integrally formed.

The second connection line 22 of the second electrode layer 20 is connected to the second data line DL2 and the switching transistor SWT(R) of the second circuit element RC to supply a data signal DATA supplied from a second data line DL2 to the switching transistor SWT(R) of the second circuit element RC.

To be more specific, the second connection line 22 may include a fourth sub connection line 22a, a fifth sub connection line 22b, and a sixth sub connection line 22c. One end of the fourth sub connection line 22a is electrically connected to the second data line DL2 through a second contact hole CNT2 and the other end may be connected to one end of the fifth sub connection line 22b. Further, one end of the sixth sub connection line 22c is connected to the other end of the fifth sub connection line 22b and the other end may be connected to the switching transistor SWT(R) of the second circuit element RC and/or configure a part of the switching transistor SWT(R) of the second circuit element RC.

In one exemplary aspect, at least a part of the second connection line 22 for supplying the data signal DATA to the switching transistor SWT (R) of the second circuit element RC may overlap at least a part of the second light emitting diode RE. Here, the second light emitting diode RE defines an emission area of the second sub pixel R so that the at least a part of the second connection line 22 which overlaps the second light emitting diode RE may include a transparent material. For example, the fifth sub connection line 22b of the second connection line 22 overlaps at least a part of the second light emitting diode RE and may include a transparent material.

According to the exemplary aspect, the fourth to sixth sub connection lines 22a, 22b, and 22c may be integrally formed.

A third connection line 23 of the second electrode layer 20 is connected to the reference voltage line RVL and the sensing transistor SET(R) of the second circuit element RC to supply a reference voltage Vref supplied from the reference voltage line RVL to the sensing transistor SET(R) of the second circuit element RC.

To be more specific, the third connection line 23 may include a seventh sub connection line 23a, an eighth sub connection line 23b, and a ninth sub connection line 23c. One end of the seventh sub connection line 23a is electrically connected to the reference voltage line RVL through a third contact hole CNT3 and the other end may be connected to one end of the eighth sub connection line 23b. Further, one end of the ninth sub connection line 23c is connected to the other end of the eighth sub connection line 23b and the other end may be connected to the sensing transistor SET(R) of the second circuit element RC and/or configure a part of the sensing transistor SET(R) of the second circuit element RC.

In one exemplary aspect, at least a part of the third connection line 23 for supplying a reference voltage Vref to the sensing transistor SET (R) of the second circuit element RC may overlap at least a part of the third light emitting diode WE of the third sub pixel W. Here, the third light emitting diode WE defines an emission area of the third sub pixel W so that the at least a part of the third connection line 23 which overlaps the third light emitting diode WE may include a transparent material. For example, the eighth sub connection line 23b of the third connection line 23 overlaps at least a part of the third light emitting diode WE and may include a transparent material.

According to the exemplary aspect, the seventh to ninth sub connection lines 23a, 23b, and 23c may be integrally formed.

A fourth connection line 24 of the second electrode layer 20 is connected to the high potential voltage line VDDL and the driving transistor DT(W) of the third circuit element WC to supply a high potential voltage VDD supplied from the high potential voltage line VDDL to the driving transistor DT(W) of the third circuit element WC.

To be more specific, the fourth connection line 24 may include a tenth sub connection line 24a, an eleventh sub connection line 24b, and a twelfth sub connection line 24c. One end of the tenth sub connection line 24a may be electrically connected to the high potential voltage line VDDL through a fourth contact hole CNT4 and the other end may be connected to one end of the eleventh sub connection line 24b. Further, one end of the twelfth sub connection line 24c may be connected to the other end of the eleventh sub connection line 24b and the other end may be connected to the driving transistor DT(W) of the third circuit element WC and/or configure a part of the driving transistor DT(W) of the third circuit element WC.

In one exemplary aspect, at least a part of the fourth connection line 24 for supplying a high potential voltage VDD to the driving transistor DT (W) of the third circuit element WC may overlap at least a part of the third light emitting diode WE. Here, the third light emitting diode WE defines an emission area of the third sub pixel W so that the at least a part of the fourth connection line 24 which overlaps the third light emitting diode WE may include a transparent material. For example, the eleventh sub connection line 24b of the fourth connection line 24 overlaps at least a part of the third light emitting diode WE and may include a transparent material.

According to the exemplary aspect, the tenth to twelfth sub connection lines 24a, 24b, and 24c may be integrally formed.

A fifth connection line 25 of the second electrode layer 20 is connected to the third data line DL3 and the switching transistor SWT(W) of the third circuit element WC to supply a data signal DATA supplied from the third data line DL3 to the switching transistor SWT(W) of the third circuit element WC.

To be more specific, the fifth connection line 25 may include a thirteenth sub connection line 25a, a fourteenth sub connection line 25b, and a fifteenth sub connection line 25c. One end of the thirteenth sub connection line 25a may be electrically connected to the third data line DL3 through a fifth contact hole CNT5 and the other end may be connected to one end of the fourteenth sub connection line 25b. Further, one end of the fifteenth sub connection line 25c may be connected to the other end of the fourteenth sub connection line 25b and the other end may be connected to the switching transistor SWT(W) of the third circuit element WC and/or configure a part of the switching transistor SWT(W) of the third circuit element WC.

In one exemplary aspect, at least a part of the fifth connection line 25 for supplying the data signal DATA to the switching transistor SWT (W) of the third circuit element WC may overlap at least a part of the third light emitting diode WE. Here, the third light emitting diode WE defines an emission area of the third sub pixel W so that the at least a part of the fifth connection line 25 which overlaps the third light emitting diode WE may include a transparent material. For example, the fourteenth sub connection line 25b of the fifth connection line 25 overlaps at least a part of the third light emitting diode WE and may include a transparent material.

According to the exemplary aspect, the thirteenth to fifteenth sub connection lines 25a, 25b, and 25c may be integrally formed.

A sixth connection line 26 of the second electrode layer 20 is connected to the reference voltage line RVL and the sensing transistor SET(W) of the third circuit element WC to supply a reference voltage Vref supplied from the reference voltage line RVL to the sensing transistor SET(W) of the third circuit element WC.

To be more specific, the sixth connection line 26 may include a sixteenth sub connection line 26a, a seventeenth sub connection line 26b, and an eighteenth sub connection line 26c. One end of the sixteenth sub connection line 26a may be electrically connected to the reference voltage line RVL through a sixth contact hole CNT6 and the other end may be connected to one end of the seventeenth sub connection line 26b. Further, one end of the eighteenth sub connection line 26c may be connected to the other end of the seventeenth sub connection line 26b and the other end may be connected to the sensing transistor SET(W) of the third circuit element WC and/or configure a part of the sensing transistor SET(W) of the third circuit element WC.

In one exemplary aspect, at least a part of the sixth connection line 26 for supplying a reference voltage Vref to the sensing transistor SET (W) of the third circuit element WC may overlap at least a part of second light emitting diode RE of the second sub pixel R. Here, the second light emitting diode RE defines an emission area of the second sub pixel R so that the at least a part of the sixth connection line 26 which overlaps the second light emitting diode RE may include a transparent material. For example, the seventeenth sub connection line 26b of the sixth connection line 26 overlaps at least a part of the second light emitting diode RE and may include a transparent material.

According to the exemplary aspect, the sixteenth to eighteenth sub connection lines 26a, 26b, and 26c may be integrally formed.

Even though it is not separately illustrated, as described above, an insulating layer may be additionally interposed between the first electrode layer 10 and the second electrode layer 20.

The third electrode layer 30 is disposed on the second electrode layer 20 and may include gate lines GL1, GL2, GL3, and GL4 which extend along the first direction DR1.

For example, as illustrated in FIGS. 6 and 7, each of the first gate line GL1 and the third gate line GL3 may be formed to extend in the first direction DR1. Further, at least parts of the first gate line GL1 and the third gate line GL3 protrude to the second direction DR2 to serve as a gate electrode of the sensing transistor SET(R) of the second circuit element RC or serve as a gate electrode of the switching transistor SWT(R) of the second circuit element RC.

As another example, as illustrated in FIGS. 6 and 7, each of the second gate line GL2 and the fourth gate line GL4 may be formed to extend in the first direction DR1. Further, at least parts of the second gate line GL2 and the fourth gate line GL4 protrude to an opposite direction of the second direction DR2 to serve as a gate electrode of the sensing transistor SET(W) of the third circuit element WC or serve as a gate electrode of the switching transistor SWT(W) of the third circuit element WC.

In one exemplary aspect, the gate line (for example, the second gate line GL2) may be formed to extend along the first direction DR1 and at least partially overlap the auxiliary electrode layer AEL.

In one exemplary aspect, the gate line (for example, the second gate line GL2) is in contact with (or connected to) the auxiliary electrode layer AEL through at least one contact hole CNT7 or CNT8 to form a double line structure.

For example, referring to FIG. 8, the auxiliary electrode layer AEL of the first electrode layer 10 may be provided on the substrate SUB.

A first insulating layer INS1 may be provided on the auxiliary electrode layer AEL (or the first electrode layer 10). For example, the first insulating layer INS1 may be disposed to cover the auxiliary electrode layer (or the first electrode layer 10). The first insulating layer INS1 may include an inorganic material including oxide or nitride. For example, the first insulating layer INS1 may include silicon oxide ($SiO_2$), silicon nitride ($SiN_x$), silicon oxy nitride SiON, or the like.

A second insulating layer INS2 may be disposed on the first insulating layer INS1. The second insulating layer INS2 serves as a gate insulating layer and may include the substantially same material as the first insulating layer INS1.

The third electrode layer 30 may be disposed on the second insulating layer INS2.

In one exemplary aspect, the gate line (for example, the second gate line GL2) of the third electrode layer 30 at least partially overlaps the auxiliary electrode layer AEL of the first electrode layer 10 and may be in contact with (or connected to) the auxiliary electrode layer AEL through a contact hole (for example, the eighth contact hole CNT8). The contact hole CNT8 passes through the insulating layers INS1 and INS2. That is, the gate line (for example, the second gate line GL2) of the third electrode layer 30 and the auxiliary electrode layer AEL of the first electrode layer 10 may have a double line structure.

As described above, the gate line (for example, the second gate line GL2) of the third electrode layer 30 and the auxiliary electrode layer AEL of the first electrode layer 10 have the double line structure so that a resistance of the gate line (for example, the second gate line GL2) is reduced. Accordingly, the RC delay of the gate signal may be reduced.

Hereinafter, a driving method of a display device according to an exemplary aspect of the present disclosure will be described with reference to FIGS. 9A to 12B.

Figure 9A:
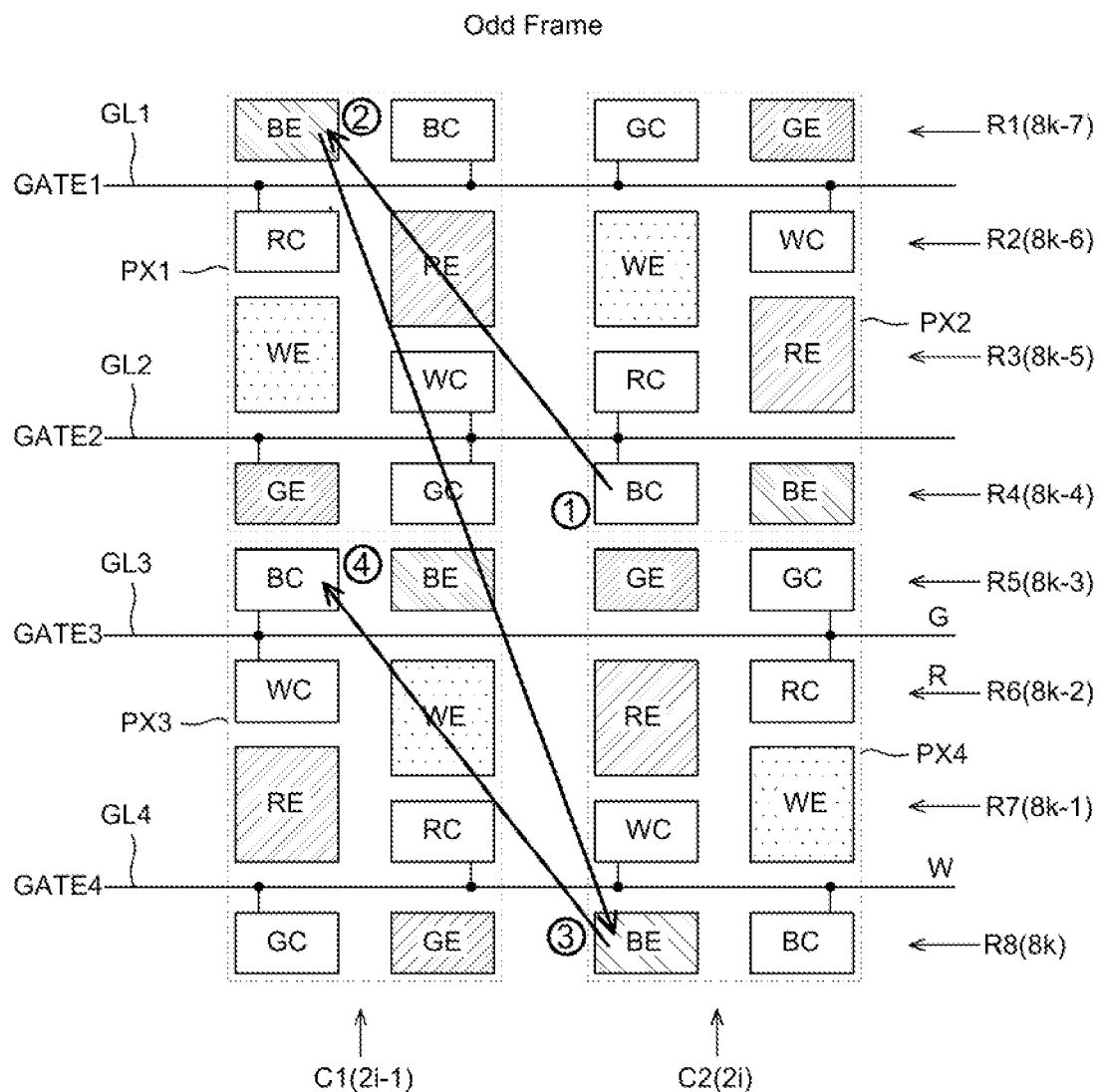
FIG. 9A is a view for explaining an example of a driving order in an odd-numbered frame of a display device of FIG. 1 according to an exemplary aspect of the present disclosure.

FIG. 9A is a view for explaining an example of a driving order in an odd-numbered frame of a display device of FIG. 1 according to an exemplary aspect of the present disclosure.

FIG. 9B is a view for explaining an example of a driving order in an even-numbered frame of a display device of FIG. 1 according to an exemplary aspect of the present disclosure.

Figure 10A:
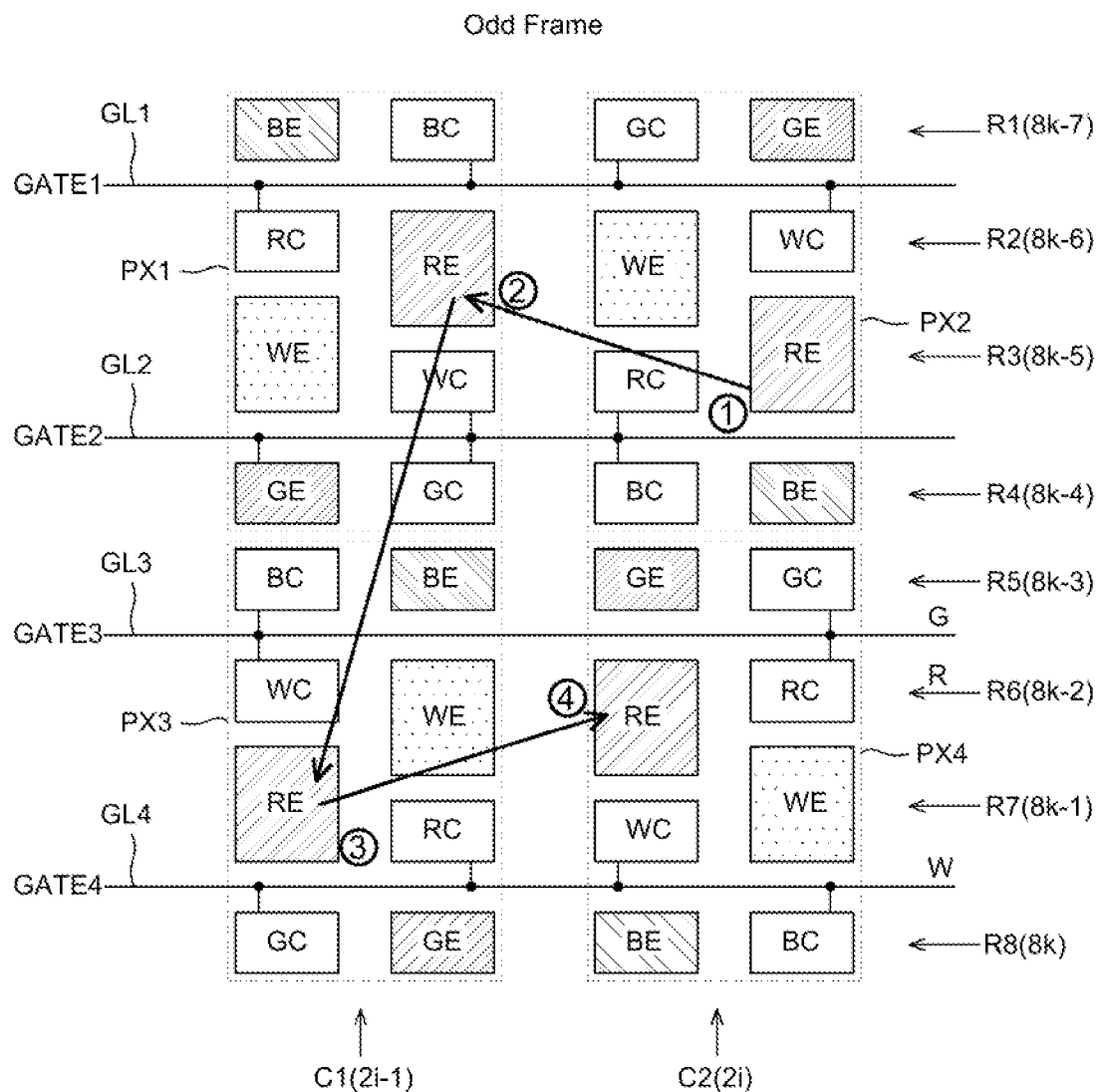
FIG. 10A is a view for explaining another example of a driving order in an odd-numbered frame of a display device of FIG. 1 according to an exemplary aspect of the present disclosure.

FIG. 10A is a view for explaining another example of a driving order in an odd-numbered frame of a display device of FIG. 1 according to an exemplary aspect of the present disclosure.

Figure 10B:
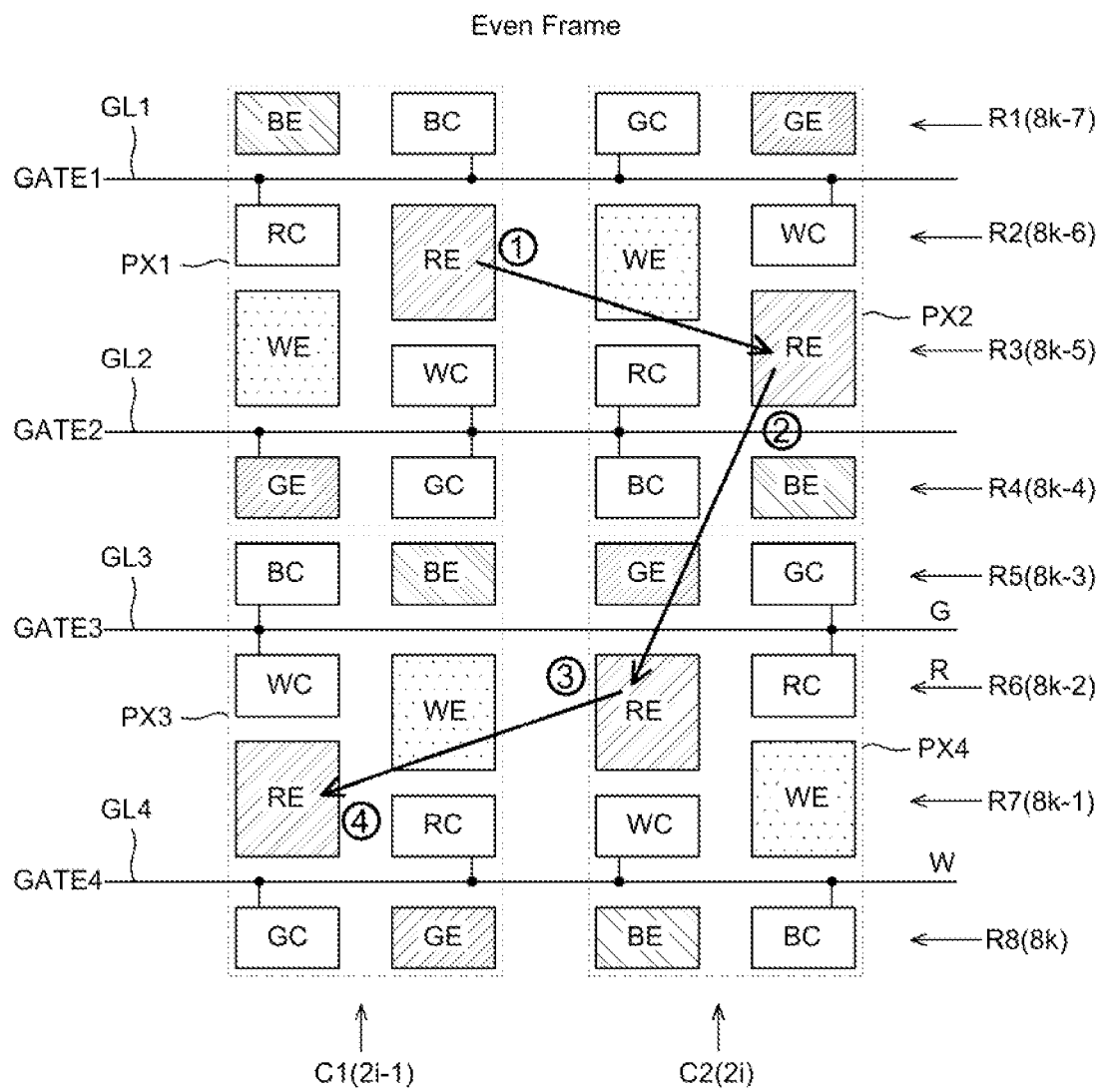
FIG. 10B is a view for explaining another example of a driving order in an even-numbered frame of a display device of FIG. 1 according to an exemplary aspect of the present disclosure.

FIG. 10B is a view for explaining another example of a driving order in an even-numbered frame of a display device of FIG. 1 according to an exemplary aspect of the present disclosure.

Figure 11A:
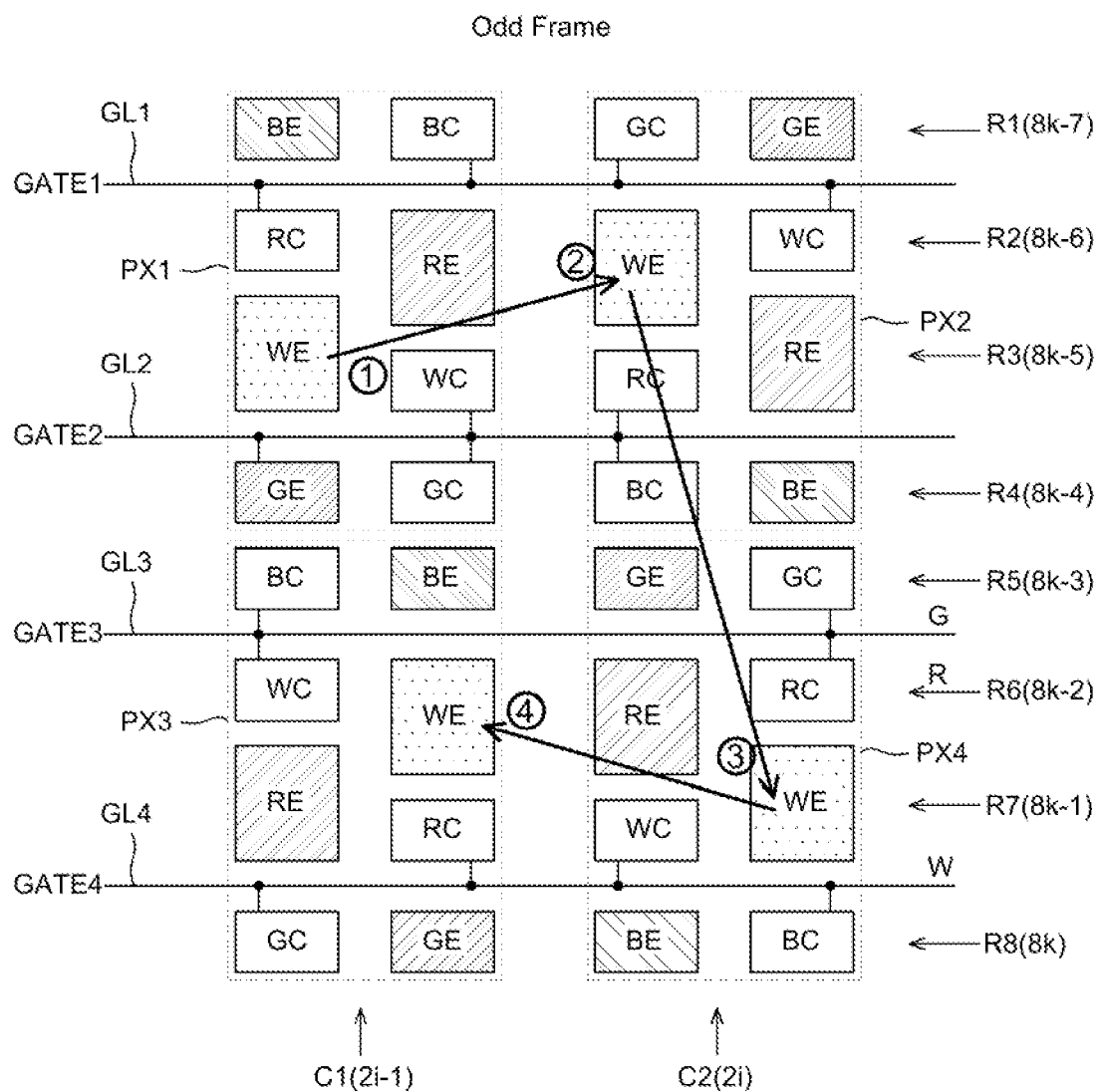
FIG. 11A is a view for explaining still another example of a driving order in an odd-numbered frame of a display device of FIG. 1 according to an exemplary aspect of the present disclosure.

FIG. 11A is a view for explaining still another example of a driving order in an odd-numbered frame of a display device of FIG. 1 according to an exemplary aspect of the present disclosure.

Figure 11B:
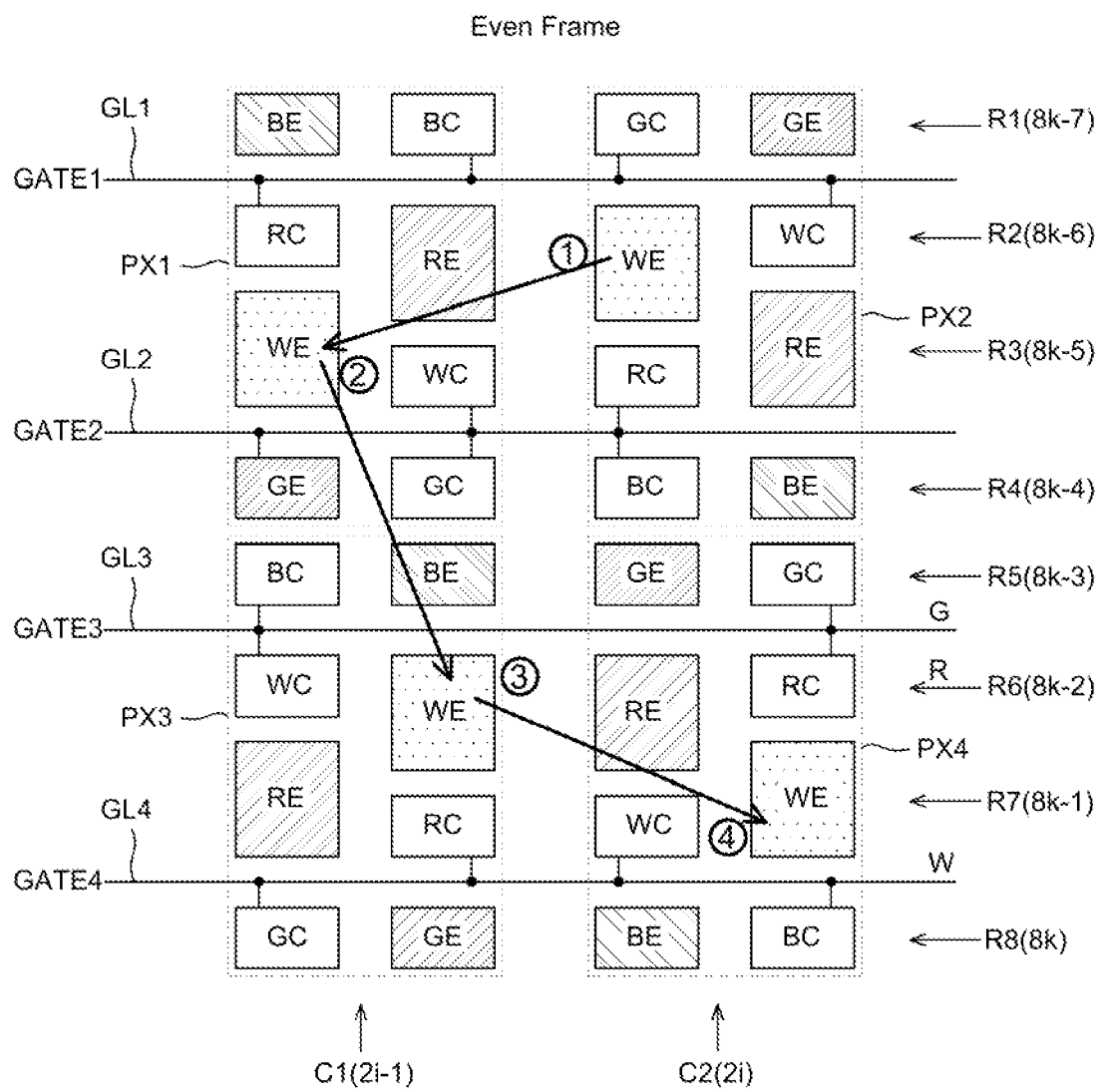
FIG. 11B is a view for explaining still another example of a driving order in an even-numbered frame of a display device of FIG. 1 according to an exemplary aspect of the present disclosure.

FIG. 11B is a view for explaining still another example of a driving order in an even-numbered frame of a display device of FIG. 1 according to an exemplary aspect of the present disclosure.

Figure 12A:
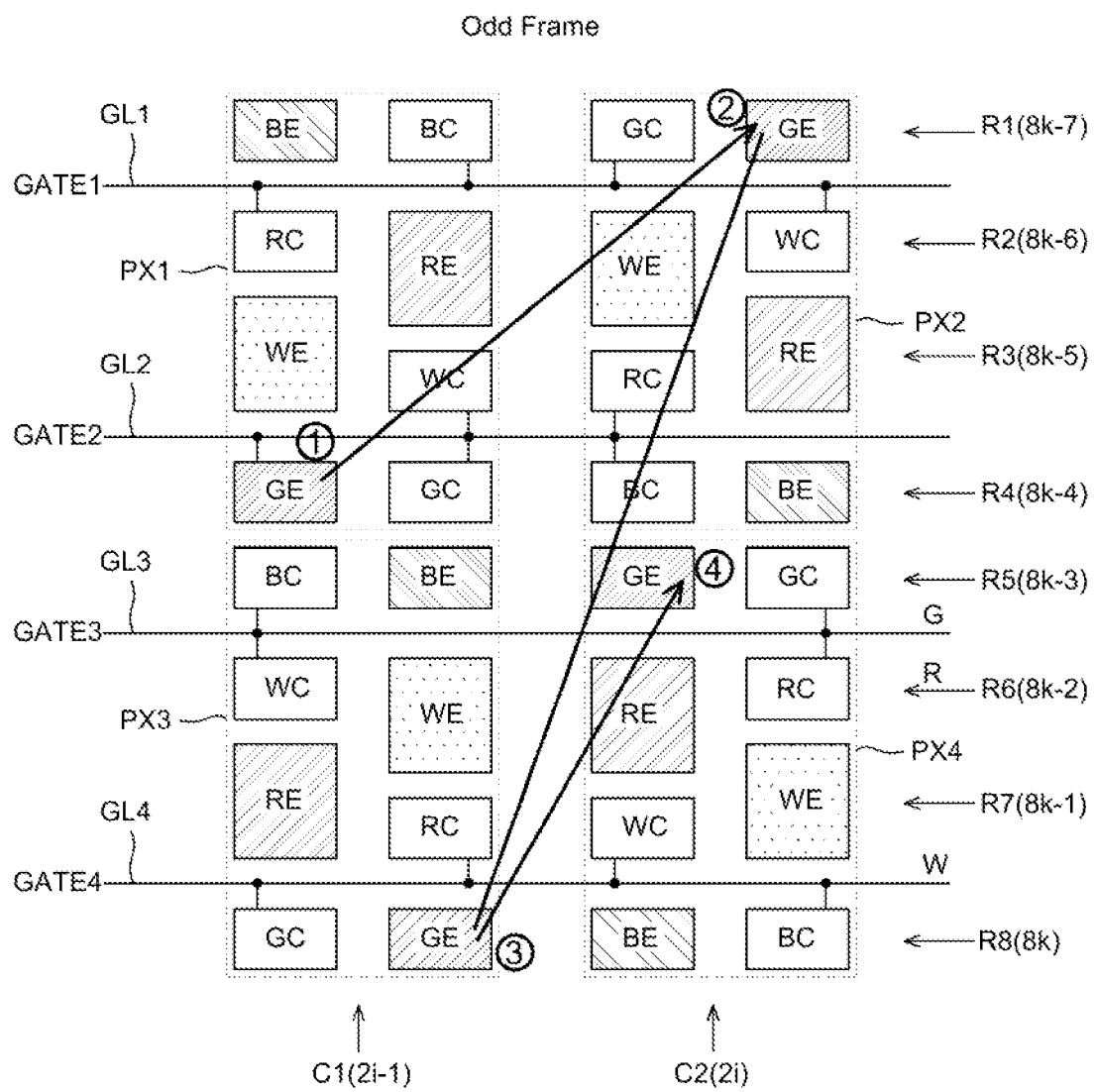
FIG. 12A is a view for explaining still another example of a driving order in an odd-numbered frame of a display device of FIG. 1 according to an exemplary aspect of the present disclosure.

FIG. 12A is a view for explaining still another example of a driving order in an odd-numbered frame of a display device of FIG. 1 according to an exemplary aspect of the present disclosure.

Figure 12B:
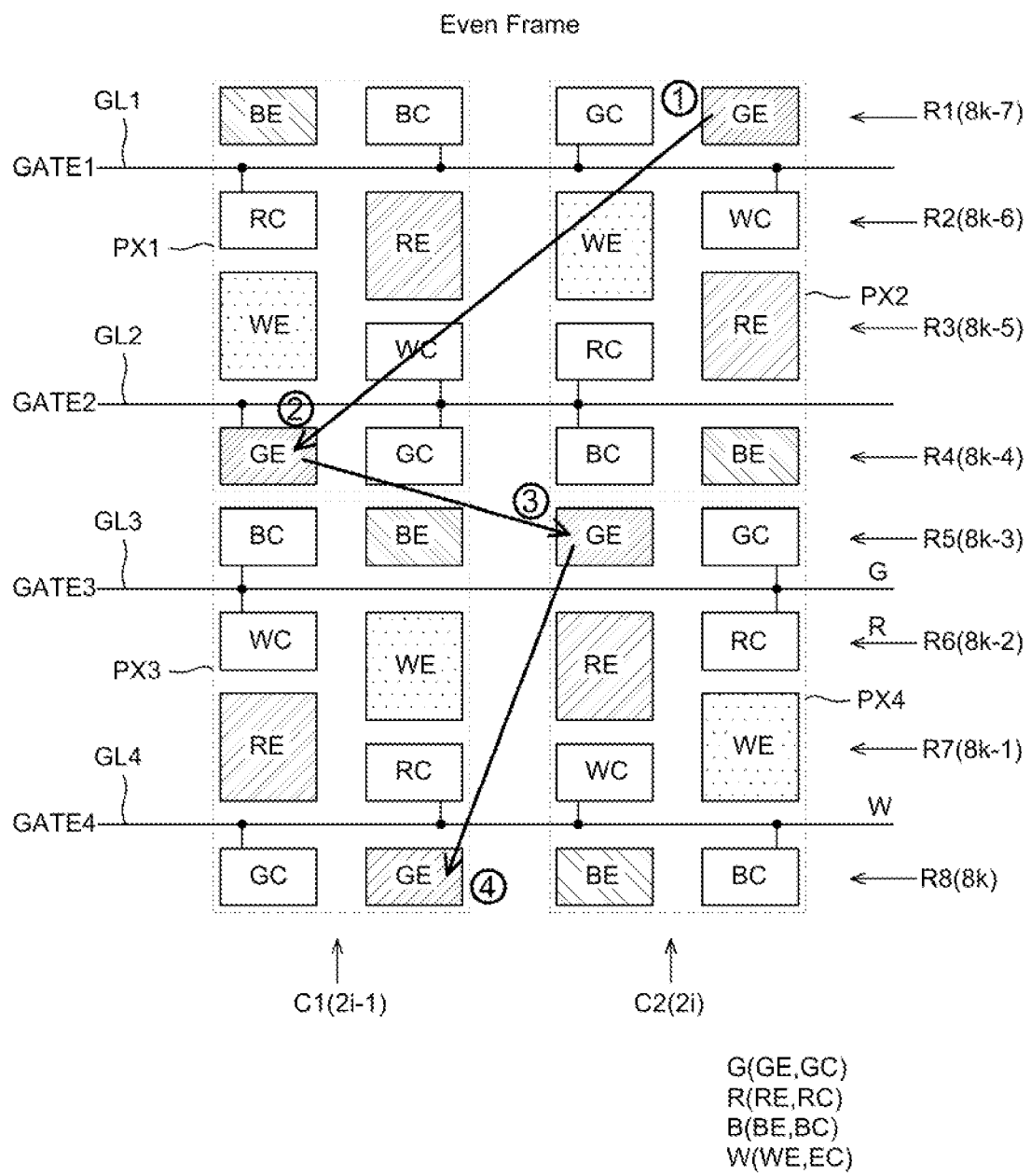
FIG. 12B is a view for explaining still another example of a driving order in an even-numbered frame of a display device of FIG. 1 according to an exemplary aspect of the present disclosure.

FIG. 12B is a view for explaining still another example of a driving order in an even-numbered frame of a display device of FIG. 1 according to an exemplary aspect of the present disclosure.

In FIGS. 9A to 12B, for the convenience of description, a data line, a reference voltage line, and a high potential voltage line which are disposed in a vertical direction (for example, the second direction DR2) are not illustrated. However, the placement relationship of the data line, the reference voltage line, and the high potential voltage line is the same as those described with reference to FIGS. 3 to 5 so that a redundant description will not be repeated.

In FIGS. 9A and 9B, a data charging method of the first sub pixel B, among the plurality of sub pixels B, R, W, and G during horizontal periods (1), (2), (3), and (4) of an odd-numbered frame and an even-numbered frame will be described, respectively. In FIGS. 10A and 10B, a data charging method of the second sub pixel R, among the plurality of sub pixels B, R, W, and G during horizontal periods (1), (2), (3), and (4) of an odd-numbered frame and an even-numbered frame will be described, respectively. In FIGS. 11A and 11B, a data charging method of the third sub pixel W, among the plurality of sub pixels B, R, W, and G during horizontal periods (1), (2), (3), and (4) of an odd-numbered frame and an even-numbered frame will be described, respectively. In FIGS. 12A and 12B, a data charging method of the fourth sub pixel G, among the plurality of sub pixels B, R, W, and G during horizontal periods (1), (2), (3), and (4) of an odd-numbered frame and an even-numbered frame will be described, respectively.

Referring to FIGS. 3 and 9A to 12B, in one exemplary aspect, a turn-on order of the gate lines GL1, GL2, GL3, and GL4 in the odd-numbered frame may be different from a turn-on order of the gate lines GL1, GL2, GL3, and GL4 in the even-numbered frame.

In one exemplary aspect, in the odd-numbered frame, the second gate line GL2, the first gate line GL1, the fourth gate line GL4, and the third gate line GL3 are sequentially turned on and in the even-numbered frame, the first gate line GL1, the second gate line GL2, the third gate line GL3, and the fourth gate line GL4 are sequentially turned on. That is, in the odd-numbered frame, the second gate signal GATE2, the first gate signal GATE1, the fourth gate signal GATE4, and the third gate signal GATE3 are sequentially applied and in the even-numbered frame, the first gate signal GATE1, the second gate signal GATE2, the third gate signal GATE3, and the fourth gate signal GATE4 may be sequentially applied.

However, this is just illustrative so that the turn-on order of the gate lines GL1, GL2, GL3, and GL4 in the odd-numbered frame and the turn-on order of the gate lines GL1, GL2, GL3, and GL4 in the even-numbered frame may be switched.

For example, a data charging method of the first sub pixel B will be described first with reference to FIGS. 9A and 9B. During a first horizontal period (1) of the odd-numbered frame, a turn-on level second gate signal GATE2 is applied to the second gate line GL2 to charge a data signal in the first sub pixel B of the second pixel PX2 disposed in the fourth row R4 of the second column C2. During a second horizontal period (2) of the odd-numbered frame, a turn-on level first gate signal GATE1 is applied to the first gate line GL1 to charge a data signal in the first sub pixel B of the first pixel PX1 disposed in the first row R1 of the first column C1. Further, during a third horizontal period (3) of the odd-numbered frame, a turn-on level fourth gate signal GATE4 is applied to the fourth gate line GL4 to charge a data signal in the first sub pixel B of the fourth pixel PX4 disposed in the eighth row R8 of the second column C2. During a fourth horizontal period (4) of the odd-numbered frame, a turn-on level third gate signal GATE3 is applied to the third gate line GL3 to charge a data signal in the first sub pixel B of the third pixel PX3 disposed in the fifth row R5 of the first column C1.

Thereafter, during a first horizontal period (1) of the even-numbered frame, a turn-on level first gate signal GATE1 is applied to the first gate line GL1 to charge a data signal in the first sub pixel B of the first pixel PX1 disposed in the first row R1 of the first column C1. During a second horizontal period (2) of the even-numbered frame, a turn-on level second gate signal GATE2 is applied to the second gate line GL2 to charge a data signal in the first sub pixel B of the second pixel PX2 disposed in the fourth row R4 of the second column C2. During a third horizontal period (3) of the even-numbered frame, a turn-on level third gate signal GATE3 is applied to the third gate line GL3 to charge a data signal in the first sub pixel B of the third pixel PX3 disposed in the fifth row R5 of the first column C1. Further, during a fourth horizontal period (4) of the even-numbered frame, a turn-on level fourth gate signal GATE4 is applied to the fourth gate line GL4 to charge a data signal in the first sub pixel B of the fourth pixel PX4 disposed in the eighth row R8 of the second column C2.

Next, a data charging method of the second sub pixel R will be described with reference to FIGS. 10A and 10B. During a first horizontal period (1) of the odd-numbered frame, a turn-on level second gate signal GATE2 is applied to the second gate line GL2 to charge a data signal in the second sub pixel R of the second pixel PX2 disposed in the third row R3 of the second column C2. During a second horizontal period (2) of the odd-numbered frame, a turn-on level first gate signal GATE1 is applied to the first gate line GL1 to charge a data signal in the second sub pixel R of the first pixel PX1 disposed in the second row R2 of the first column C1. Further, during a third horizontal period (3) of the odd-numbered frame, a turn-on level fourth gate signal GATE4 is applied to the fourth gate line GL4 to charge a data signal in the second sub pixel R of the third pixel PX3 disposed in the seventh row R7 of the first column C1. During a fourth horizontal period (4) of the odd-numbered frame, a turn-on level third gate signal GATE3 is applied to the third gate line GL3 to charge a data signal in the second sub pixel R of the fourth pixel PX4 disposed in the sixth row R6 of the second column C2.

Thereafter, during a first horizontal period (1) of the even-numbered frame, a turn-on level first gate signal GATE1 is applied to the first gate line GL1 to charge a data signal in the second sub pixel R of the first pixel PX1 disposed in the second row R2 of the first column C1. During the second horizontal period (2) of the even-numbered frame, a turn-on level second gate signal GATE2 is applied to the second gate line GL2 to charge a data signal in the second sub pixel R of the second pixel PX2 disposed in the third row R3 of the second column C2. During a third horizontal period (3) of the even-numbered frame, a turn-on level third gate signal GATE3 is applied to the third gate line GL3 to charge a data signal in the second sub pixel R of the fourth pixel PX4 disposed in the sixth row R6 of the second column C2. Further, during a fourth horizontal period (4) of the even-numbered frame, a turn-on level fourth gate signal GATE4 is applied to the fourth gate line GL4 to charge a data signal in the second sub pixel R of the third pixel PX3 disposed in the seventh row R7 of the first column C1.

Next, a data charging method of the third sub pixel W will be described with reference to FIGS. 11A and 11B. During a first horizontal period (1) of the odd-numbered frame, a turn-on level second gate signal GATE2 is applied to the second gate line GL2 to charge a data signal in the third sub pixel W of the first pixel PX1 disposed in the third row R3 of the first column C1. During a second horizontal period (2) of the odd-numbered frame, a turn-on level first gate signal GATE1 is applied to the first gate line GL1 to charge a data signal in the third sub pixel W of the second pixel PX2 disposed in the second row R2 of the second column C2. Next, during a third horizontal period (3) of the odd-numbered frame, a turn-on level fourth gate signal GATE4 is applied to the fourth gate line GL4 to charge a data signal in the third sub pixel W of the fourth pixel PX4 disposed in the seventh row R7 of the second column C2. During a fourth horizontal period (4) of the odd-numbered frame, a turn-on level third gate signal GATE3 is applied to the third gate line GL3 to charge a data signal in the third sub pixel W of the third pixel PX3 disposed in the sixth row R6 of the first column C1.

Thereafter, during a first horizontal period (1) of the even-numbered frame, a turn-on level first gate signal GATE1 is applied to the first gate line GL1 to charge a data signal in the third sub pixel W of the second pixel PX2 disposed in the second row R2 of the second column C2. During a second horizontal period (2) of the even-numbered frame, a turn-on level second gate signal GATE2 is applied to the second gate line GL2 to charge a data signal in the third sub pixel W of the first pixel PX1 disposed in the third row R3 of the first column C1. During a third horizontal period (3) of the even-numbered frame, a turn-on level third gate signal GATE3 is applied to the third gate line GL3 to charge a data signal in the third sub pixel W of the third pixel PX3 disposed in the sixth row R6 of the first column C1. Further, during a fourth horizontal period (4) of the even-numbered frame, a turn-on level fourth gate signal GATE4 is applied to the fourth gate line GL4 to charge a data signal in the third sub pixel W of the fourth pixel PX4 disposed in the seventh row R7 of the second column C2.

Next, a data charging method of the fourth sub pixel G will be described with reference to FIGS. 12A and 12B. During a first horizontal period (1) of the odd-numbered frame, a turn-on level second gate signal GATE2 is applied to the second gate line GL2 to charge a data signal in the fourth sub pixel G of the first pixel PX1 disposed in the fourth row R4 of the first column C1. During a second horizontal period (2) of the odd-numbered frame, a turn-on level first gate signal GATE1 is applied to the first gate line GL1 to charge a data signal in the fourth sub pixel G of the second pixel PX2 disposed in the first row R1 of the second column C2. Further, during a third horizontal period (3) of the odd-numbered frame, a turn-on level fourth gate signal GATE4 is applied to the fourth gate line GL4 to charge a data signal in the fourth sub pixel G of the third pixel PX3 disposed in the eighth row R8 of the first column C1. During a fourth horizontal period (4) of the odd-numbered frame, a turn-on level third gate signal GATE3 is applied to the third gate line GL3 to charge a data signal in the fourth sub pixel G of the fourth pixel PX4 disposed in the fifth row R5 of the second column C2.

Thereafter, during a first horizontal period (1) of the even-numbered frame, a turn-on level first gate signal GATE1 is applied to the first gate line GL1 to charge a data signal in the fourth sub pixel G of the second pixel PX2 disposed in the first row R1 of the second column C2. During a second horizontal period (2) of the even-numbered frame, a turn-on level second gate signal GATE2 is applied to the second gate line GL2 to charge a data signal in the fourth sub pixel G of the first pixel PX1 disposed in the fourth row R4 of the first column C1. During a third horizontal period (3) of the even-numbered frame, a turn-on level third gate signal GATE3 is applied to the third gate line GL3 to charge a data signal in the fourth sub pixel G of the fourth pixel PX4 disposed in the fifth row R5 of the second column C2. Further, during a fourth horizontal period (4) of the even-numbered frame, a turn-on level fourth gate signal GATE4 is applied to the fourth gate line GL4 to charge a data signal in the fourth sub pixel G of the third pixel PX3 disposed in the eighth row R8 of the first column C1.

Figure 13:
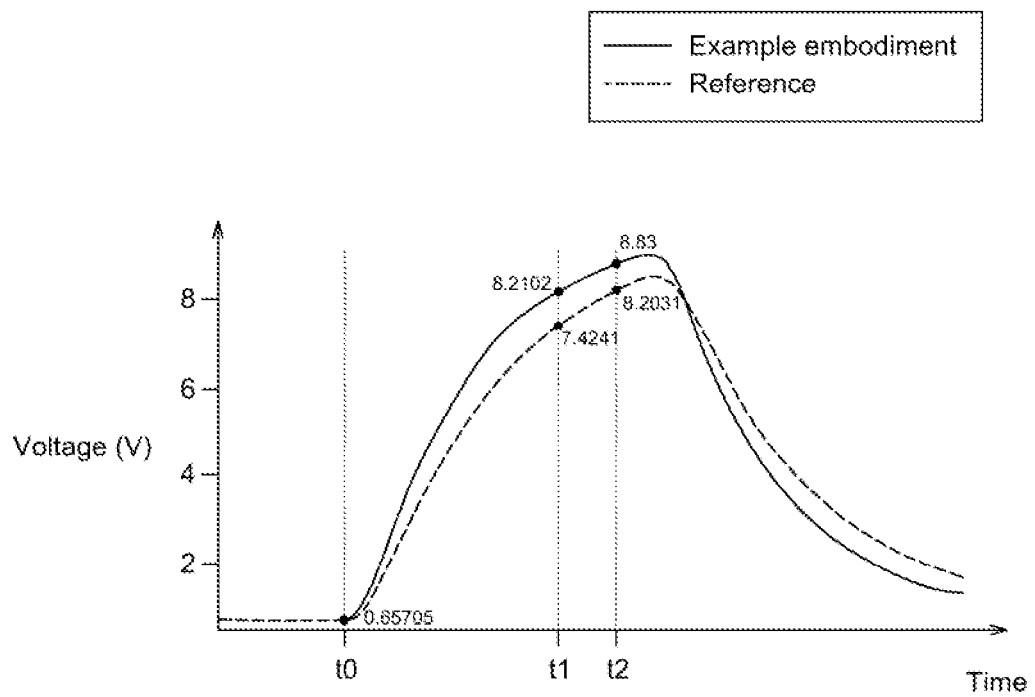
FIG. 13 is a waveform illustrating a data signal (data voltage) of a display device according to an exemplary aspect of the present disclosure.

FIG. 13 is a waveform illustrating a data signal (data voltage) of a display device according to an exemplary aspect of the present disclosure.

Referring to FIGS. 1 to 13, in the display device 100 according to the exemplary aspect of the present disclosure, the number of data lines is reduced as described above so that the total resistance of the data line is reduced to reduce the RC delay of the data signal. Accordingly, a charging rate of the data signal may be increased.

In contrast, in a display device according to a comparative aspect of the present disclosure, a plurality of data lines configured to supply data signals to the same color pixels may be configured as one group. That is, in the display device according to the comparative aspect of the present disclosure, one common line is diverged into a plurality of data lines to supply data signals to the pixels. As described above, in the display device according to the comparative aspect of the present disclosure, the plurality of data lines is designed to be grouped to one common line so that the RC delay of the data signal may be increased.

To be more specific, as illustrated in FIG. 13, in the display device according to the comparative aspect of the present disclosure, the data voltage starts being charged from 0.65 V at a time t0. At a time t1, the data voltage is charged to 7.4241 V and then at a time t2, the data voltage is charged to 8.2031 V (denoted by "Reference" in FIG. 13).

In contrast, in the display device 100 according to the exemplary aspect of the present disclosure, the data voltage starts being charged from 0.65 V at a time t0. At a time t1, the data voltage is charged to 8.2102 V and then at a time t2, the data voltage is charged to 8.83 V.

That is, at the time t1, the data charging rate of the display device 100 according to the exemplary aspect of the present disclosure may be increased by 9.57% from the data charging rate of the display device according to the comparative aspect of the present disclosure. Further, at the time t2, the data charging rate of the display device 100 according to the exemplary aspect of the present disclosure may be increased by 7.09% from the data charging rate of the display device according to the comparative aspect of the present disclosure. That is, the data charging rate of the display device 100 according to the exemplary aspect of the present disclosure may be improved.

In the display device according to the exemplary embodiments of the present disclosure, the number of data lines is minimized so that an area occupied by the data lines in the display panel may be reduced. Accordingly, the emission area may be designed to expand and the aperture ratio of the display device may be improved.

Further, in the display device according to the exemplary embodiments of the present disclosure, the number of data lines is reduced so that a total resistance of the data line is reduced and the RC delay of the data signal may be reduced. Accordingly, a charging rate of the data signal may be increased.

Further, in the display device according to the exemplary embodiments of the present disclosure, the gate line has a double line structure so that a resistance of the gate line may be reduced. Accordingly, the RC delay of the gate signal may be reduced.

The exemplary embodiments of the present disclosure may also be described as follows:

According to an aspect of the present disclosure, a display device includes a display panel in which a plurality of pixels each including a first sub pixel, a second sub pixel, a third sub pixel, and a fourth sub pixel is disposed; a data driver configured to supply a data signal to the pixels through data lines; and a gate driver configured to supply a gate signal to the pixels through gate lines. First sub pixels and fourth sub pixels disposed in the same column may be disposed with the same interval and second sub pixels and third sub pixels disposed in the same column may be disposed with different intervals.

The pixels may include a first pixel disposed in a first column, a second pixel disposed in a second column which is adjacent to the first column in a first direction, a third pixel which is disposed in the first column and is adjacent to the first pixel in a second direction which is different from the first direction and a fourth pixel which is disposed in the second column and is adjacent to the second pixel in the second direction.

The first sub pixels and the fourth sub pixels which are disposed in the same column may be disposed with an interval corresponding to a distance between centers of adjacent two pixels which are disposed in the corresponding column.

The first sub pixels and the fourth sub pixels which are disposed in the first column may be disposed with an interval corresponding to a distance between centers of the first pixel and the third pixel.

The sub pixels included in two pixels which are adjacent along the first direction may be disposed in different orders.

Placement orders of the sub pixels included in the two pixels which are adjacent along the first direction may be opposite to each other.

The sub pixels included in the first pixel disposed in the first column may be disposed in an order of the first sub pixel, the second sub pixel, the third sub pixel, and the fourth sub pixel along the second direction and the sub pixels included in the second pixel disposed in the second column are disposed in the order of the fourth sub pixel, the third sub pixel, the second sub pixel, and the first sub pixel along the second direction.

The first sub pixel may include a first light emitting diode and a first circuit element, the second sub pixel may include a second light emitting diode and a second circuit element, the third sub pixel may include a third light emitting diode and a third circuit element, and the fourth sub pixel may include a fourth light emitting diode and a fourth circuit element.

The light emitting diodes and the circuit elements included in the first to fourth sub pixels may be disposed to be adjacent along the first direction.

The first column may include a first sub column and a second sub column which is adjacent to the first sub column in the first direction, the second column may include a third sub column and a fourth sub column which is adjacent to the third sub column in the first direction, and light emitting diodes which are included in two pixels adjacent to each other along the second direction and emit same color light are disposed in different sub columns.

The first light emitting diode included in the first sub pixel of the first pixel may be disposed in the first sub column, the first light emitting diode included in the first sub pixel of the third pixel may be disposed in the second sub column, the first light emitting diode included in the first sub pixel of the fourth pixel may be disposed in the third sub column, and the first light emitting diode included in the first sub pixel of the second pixel may be disposed in the fourth sub column.

The light emitting diodes which are included in two pixels adjacent to each other along the first direction and emit same color light are disposed to be spaced apart from each other.

The display device may further comprise an auxiliary electrode layer formed on the same layer as the data lines, wherein each of the gate lines and the auxiliary electrode layer may be connected to each other through a contact hole while overlapping in at least partial area.

The sub pixels included in the first pixel may be disposed in first to fourth rows which are sequentially disposed along the second direction, respectively, the sub pixels included in the second pixel may be disposed in the first to fourth rows, respectively, the sub pixels included in the third pixel may be disposed in fifth to eighth rows which are sequentially disposed along the second direction, respectively, and the sub pixels included in the fourth pixel may be disposed in the fifth to eighth rows, respectively.

Among the gate lines, a first gate line may be disposed between the first row and the second row, a second gate line may be disposed between the third row and the fourth row, a third gate line may be disposed between the fifth row and the sixth row, and a fourth gate line may be disposed between the seventh row and the eighth row.

An order of applying turn-on level gate signals to the gate lines in an odd-numbered frame may be different from an order of applying turn-on level gate signals to the gate lines in an even-numbered frame.

In the odd-numbered frame, the turn-on level gate signals may be applied in the order of the second gate line, the first gate line, the fourth gate line, and the third gate line and in the even-numbered frame, the turn-on level gate signals may be applied in the order of the first gate line, the second gate line, the third gate line, and the fourth gate line.

The data lines may include a first data line connected to the first sub pixels, a second data line connected to the second sub pixels, a third data line connected to the third sub pixels, and a fourth data line connected to the fourth sub pixels, the first data line and the second data line may be disposed at one sides of pixels disposed in the same column and the third data line and the fourth data line may be disposed at the other sides of the pixels disposed in the same column.

The display device may further comprise a high potential voltage line configured to supply a high potential voltage to the pixels, wherein the high potential voltage line may be disposed between the first data line and the second data line or between the third data line and the fourth data line.

The display device may further comprise a reference voltage line configured to supply a reference voltage to the pixels, wherein the reference voltage line may be disposed between the light emitting diode and the circuit element included in each of the sub pixels.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A display device, comprising:
    a display panel including a plurality of pixels arranged in a plurality of rows and a plurality of columns, each row extending along a first direction and each column extending along a second direction, each of the plurality of pixels including a plurality of sub pixels including a first sub pixel, a second sub pixel, a third sub pixel, and a fourth sub pixel, and each of the plurality of sub pixels includes a light emitting diode and a circuit element adjacent along the first direction;
    a data driver configured to supply a data signal to the plurality of pixels through data lines;
    a gate driver configured to supply a gate signal to the plurality of pixels through gate lines; and
    a plurality of connection lines connected to the data lines and the plurality of sub pixels,
    wherein, in each of the plurality of pixels, the plurality of sub pixels are disposed sequentially along the second direction,
    wherein for adjacent pixels in a same column along the second direction, a first interval in the second direction between first sub pixels in the adjacent pixels is the same as a fourth interval in the second direction between fourth sub pixels in the adjacent pixels,
    wherein for the adjacent pixels in the same column along the second direction, a second interval in the second direction between second sub pixels in the adjacent pixels is different from a third interval in the second direction between third sub pixels in the adjacent pixels, and
    wherein the plurality of connection lines extend in the first direction, and some of the plurality of connection lines overlap at least a part of the light emitting diode corresponding to an emission area of the plurality of sub pixels.

2. The display device according to claim 1, wherein the plurality of pixels includes:
    a first pixel disposed in a first column;
    a second pixel disposed in a second column which is adjacent to the first column in the first direction;
    a third pixel which is disposed in the first column and is adjacent to the first pixel in the second direction; and
    a fourth pixel which is disposed in the second column and is adjacent to the second pixel in the second direction.

3. The display device according to claim 2, wherein the first interval and the fourth interval correspond to a distance between centers of respective sub pixels in the adjacent pixels in the same column.

4. The display device according to claim 3, wherein the first interval corresponds to a distance between a center a first sub pixel in the first pixel and a center of a first sub pixel in the third pixel, and
    wherein the fourth interval corresponds to a distance between a center of a fourth sub pixel in the first pixel and a center of a fourth sub pixel in the third pixel.

5. The display device according to claim 2, wherein sub pixels included in the first pixel in the first column are disposed in an order of the first sub pixel, the second sub pixel, the third sub pixel, and the fourth sub pixel along the second direction, and
    wherein sub pixels included in the second pixel disposed in the second column are disposed in the order of the fourth sub pixel, the third sub pixel, the second sub pixel, and the first sub pixel along the second direction.

6. The display device according to claim 2, wherein for each of the plurality of pixels:
    the first sub pixel includes a first light emitting diode and a first circuit element,
    the second sub pixel includes a second light emitting diode and a second circuit element,
    the third sub pixel includes a third light emitting diode and a third circuit element, and
    the fourth sub pixel includes a fourth light emitting diode and a fourth circuit element.

7. The display device according to claim 6, wherein the first column includes a (i) first sub column and (ii) a second sub column adjacent to the first sub column in the first direction,
    wherein the second column includes (i) a third sub column and (ii) a fourth sub column adjacent to the third sub column in the first direction, and
    wherein for adjacent pixels in a same row along the first direction:
    the light emitting diode configured to emit a color in one of the adjacent pixels is disposed in the first sub column and the light emitting diode configured to emit the same color in another of the adjacent pixels is disposed in the fourth sub column, or the light emitting diode configured to emit the color in the one of the adjacent pixels is disposed in the second sub column and the light emitting diode configured to emit the same color in the another of the adjacent pixels is disposed in the third sub column.

8. The display device according to claim 7, wherein the first light emitting diode included in the first sub pixel of the first pixel is in the first sub column,
wherein the first light emitting diode included in the first sub pixel of the third pixel is in the second sub column,
wherein the first light emitting diode included in the first sub pixel of the fourth pixel is in the third sub column, and
wherein the first light emitting diode included in the first sub pixel of the second pixel is in the fourth sub column.

9. The display device according to claim 6, wherein for adjacent pixels in a same row along the first direction, the light emitting diodes that are configured emit same color light in the adjacent pixels are disposed to be spaced apart from each other.

10. The display device according to claim 6, further comprising:
a reference voltage line configured to supply a reference voltage to the plurality of pixels,
wherein the reference voltage line is disposed between the light emitting diode and the circuit element included in each of the sub pixels.

11. The display device according to claim 2, further comprising:
an auxiliary electrode layer formed on a different layer from the gate lines,
wherein each of the gate lines and the auxiliary electrode layer are connected to each other through a contact hole while partially overlapping.

12. The display device according to claim 2, wherein sub pixels included in the first pixel are sequentially disposed in first to fourth rows,
sub pixels included in the second pixel are sequentially disposed in the first to fourth rows,
sub pixels included in the third pixel are sequentially disposed in fifth to eighth rows, and
sub pixels included in the fourth pixel are sequentially disposed in the fifth to eighth rows.

13. The display device according to claim 12, wherein among the gate lines:
a first gate line is disposed between the first row and the second row,
a second gate line is disposed between the third row and the fourth row,
a third gate line is disposed between the fifth row and the sixth row, and
a fourth gate line is disposed between the seventh row and the eighth row.

14. The display device according to claim 13, wherein an order of applying turn-on level gate signals to the gate lines in an odd-numbered frame is different from an order of applying turn-on level gate signals to the gate lines in an even-numbered frame.

15. The display device according to claim 14, wherein in the odd-numbered frame, the turn-on level gate signals are applied in an order of the second gate line, the first gate line, the fourth gate line, and the third gate line, and
in the even-numbered frame, the turn-on level gate signals are applied in an order of the first gate line, the second gate line, the third gate line, and the fourth gate line.

16. The display device according to claim 2, wherein the data lines include:
a first data line connected to the first sub pixels,
a second data line connected to the second sub pixels,
a third data line connected to the third sub pixels, and
a fourth data line connected to the fourth sub pixels,
wherein the first data line and the second data line are disposed at one side of the plurality of pixels disposed in the same column, and
wherein the third data line and the fourth data line are disposed at another side of the plurality of pixels disposed in the same column.

17. The display device according to claim 16, further comprising:
a high potential voltage line configured to supply a high potential voltage to the plurality of pixels,
wherein the high potential voltage line is disposed between the first data line and the second data line or between the third data line and the fourth data line.

18. The display device according to claim 1, wherein for adjacent pixels in a same row along the first direction, placement orders of the sequentially disposed plurality of sub pixels along the second direction in the adjacent pixels are opposite to each other.

19. The display device according to claim 1, wherein a portion of each of the plurality of connection lines overlapping the emission area of the plurality of sub pixels includes a transparent material.

20. The display device according to claim 19, wherein one end of each of the plurality of connecting lines is electrically connected to each of the data lines through a contact hole.

* * * * *